(12) United States Patent
Wang

(10) Patent No.: US 10,375,724 B2
(45) Date of Patent: *Aug. 6, 2019

(54) METHOD FOR DETECTING DEVICE-TO-DEVICE SIGNAL, USER EQUIPMENT, AND BASE STATION

(71) Applicant: Huawei Device Co., Ltd., Dongguan, Guangdong (CN)

(72) Inventor: Jian Wang, Dongguan (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,767

(22) Filed: Jun. 27, 2018

(65) Prior Publication Data

US 2018/0332609 A1 Nov. 15, 2018

Related U.S. Application Data

(63) Continuation of application No. 14/907,227, filed as application No. PCT/CN2014/073818 on Mar. 21, 2014, now Pat. No. 10,045,371.

(51) Int. Cl.
*H04W 56/00* (2009.01)
*H04W 72/12* (2009.01)
(Continued)

(52) U.S. Cl.
CPC ..... *H04W 72/1289* (2013.01); *H04W 56/002* (2013.01); *H04W 56/0045* (2013.01);
(Continued)

(58) Field of Classification Search
CPC .......... H04W 72/1289; H04W 76/023; H04W 56/002; H04W 56/0045; H04W 84/042; H04W 92/18
See application file for complete search history.

(56) References Cited

U.S. PATENT DOCUMENTS 9,949,145 B2 * 4/2018 Lee ................... H04W 24/02
2010/0093364 A1 4/2010 Ribeiro et al.
(Continued)

FOREIGN PATENT DOCUMENTS

CN 102123111 A 7/2011
CN 103108389 A 5/2013
(Continued)

OTHER PUBLICATIONS

"3rd Generation Partnership Project; Technical Specification Group Radio Access Network; Evolved Universal Terrestrial Radio Access (E-UTRA); LTE physical layer; General description (Release 11)"; 3GPP TS 36.201 V11.1.0; Dec. 2012; 13 pages.
(Continued)

*Primary Examiner* — Charles C Jiang
*Assistant Examiner* — Ryan C Kavleski

(57) ABSTRACT

Embodiments of the present invention provide a method for detecting a device-to-device signal, a user equipment, and a base station. The method includes: receiving a first message; determining, according to the first message, a first timing advance for a first user equipment to detect a D2D signal sent by a second user equipment; determining a reference time according to a received reference signal; determining, according to the first timing advance and the reference time, a first time for detecting the D2D signal; and detecting the D2D signal at the first time. So that when the user equipment detects the D2D signal at the determined time for detecting a D2D signal, a D2D signal detection success rate can be improved.

18 Claims, 7 Drawing Sheets

(51) Int. Cl.
*H04W 76/14* (2018.01)
*H04W 92/18* (2009.01)
*H04W 84/04* (2009.01)

(52) U.S. Cl.
CPC .......... *H04W 76/14* (2018.02); *H04W 84/042* (2013.01); *H04W 92/18* (2013.01)

(56) References Cited

U.S. PATENT DOCUMENTS

| | | | |
|---|---|---|---|
| 2011/0182280 | A1 | 7/2011 | Charbit et al. |
| 2012/0236830 | A1 | 9/2012 | Takano et al. |
| 2012/0258706 | A1 | 10/2012 | Yu et al. |
| 2013/0142268 | A1 | 6/2013 | Gao et al. |
| 2013/0170414 | A1 | 7/2013 | Kwon |
| 2014/0293968 | A1* | 10/2014 | Ebrahimi Tazeh Mahalleh .......... H04W 56/001 370/336 |
| 2014/0370904 | A1 | 12/2014 | Smith et al. |
| 2015/0110037 | A1 | 4/2015 | Wu et al. |
| 2015/0139197 | A1 | 5/2015 | He et al. |
| 2015/0319745 | A1 | 11/2015 | Seo et al. |
| 2015/0358964 | A1 | 12/2015 | Tiirola et al. |
| 2016/0007383 | A1 | 1/2016 | Chae et al. |
| 2016/0007400 | A1 | 1/2016 | Agiwal et al. |
| 2016/0036576 | A1 | 2/2016 | Wang |
| 2016/0073392 | A1 | 3/2016 | Byun et al. |
| 2016/0150492 | A1 | 5/2016 | Wang |
| 2016/0219393 | A1 | 7/2016 | Wang |
| 2017/0026937 | A1 | 1/2017 | Jung et al. |

FOREIGN PATENT DOCUMENTS

| | | | |
|---|---|---|---|
| CN | 103188742 | A | 7/2013 |
| CN | 103250435 | A | 8/2013 |
| CN | 103347246 | A | 10/2013 |
| CN | 103457690 | A | 12/2013 |
| CN | 103974407 | A | 8/2014 |
| EP | 2866503 | A1 | 4/2015 |
| EP | 2925067 | A1 | 9/2015 |
| EP | 3018953 | A1 | 5/2016 |
| JP | 2010110022 | A | 5/2010 |
| JP | 2011130088 | A | 6/2011 |
| JP | 2016502367 | A | 1/2016 |
| WO | 2007096823 | A1 | 8/2007 |
| WO | 2010108549 | A1 | 9/2010 |
| WO | 2013100831 | A1 | 7/2013 |
| WO | 2013104084 | A1 | 7/2013 |
| WO | 2013181421 | A2 | 12/2013 |
| WO | 2014003430 | A1 | 1/2014 |
| WO | 2014067132 | A1 | 5/2014 |

OTHER PUBLICATIONS

"3rd Generation Partnership Project; Technical Specification Group Radio Access Network; Evolved Universal Terrestrial Radio Access (E-UTRA); Physical layer; Measurements (Release 11)"; 3GPP TS 36.214 V11.1.0; Dec. 2012; 14 pages.
Huawei et al., "Considerations on timing for D2D", 3GPP TSG-RAN WG1, Meeting #75, R1-135047, San Francisco, USA, Nov. 11-15, 2013, 5 pages.
LG Electronics, "Discussion on D2D signal transmission and reception timing", 3GPP TSG-RAN WG1, Meeting #76bis, R1-141359, Shenzhen, China, Mar. 31-Apr. 4, 2014, 6 pages.
Huawei et al., "Timing signaling for D2D communication", 3GPP TSG-RAN WG1, Meeting #76b, R1-141596, Shenzhen, China, Mar. 31-Apr. 4, 2014, 5 pages.
Huawei et al., "Timing signaling for D2D communication", 3GPP TSG-RAN WG1, Meeting #77, R1-141930, Seoul, Korea, May 19-23, 2014, 5 pages.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.0.0, Dec. 2013, 88 pages.
"Considerations on timing and synchronization for D2D", Huawei, HiSilicon, 3GPP TSG RAN WG1 Meeting #74bis, Oct. 7-11, 2013, 5 pages, R1-134072.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 349 pages.
"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.0.0, Dec. 2013, 57 pages.
"3rd Generation Partnership Project; Technical Specification Group Radio Access Network; Evolved Universal Terrestrial Radio Access (E-UTRA); Physical layer procedures (Release 12)", 3GPP TS 36.213 V12.0.0, Dec. 2013, 186 pages.
"3rd Generation Partnership Project; Technical Specification Group Radio Access Network; Evolved Universal Terrestrial Radio Access (E-UTRA); Physical channels and modulation (Release 12)", 3GPP TS 36.211 12.0.0, Dec. 2013, 120 pages.
Huawei, HiSilicon, "Considerations on timing and synchronization for D2D", 3GPP TSG RAN WG1 Meeting #74bis, R1-134072, Guangzhou, China, Oct. 7-11, 2013, 5 pages.
3GPP TS 36.211 V12.0.0 (Dec. 2013), 3rd Generation Partnership Project; Technical Specification Group Radio Access Network; Evolved Universal Terrestrial Radio Access (E-UTRA); Physical channels and modulation(Release 12), dated Dec. 2013, 120 pages.
3GPP TS 36.213 V12.0.0 (Dec. 2013), 3rd Generation Partnership Project; Technical Specification Group Radio Access Network; Evolved Universal Terrestrial Radio Access (E-UTRA); Physical layer procedures (Release 12), dated Dec. 2013, 186 pages.
3GPP TS 36.331 V12.0.0 (Dec. 2013), 3rd Generation Partnership Project; Technical Specification Group Radio Access Network; Evolved Universal Terrestrial Radio Access (E-UTRA); Radio Resource Control (RRC); Protocol specification (Release 12), dated Dec. 2013, 349 pages.
3GPP TS 36.321 V12.0.0 (Dec. 2013), 3rd Generation Partnership Project;Technical Specification Group Radio Access Network; Evolved Universal Terrestrial Radio Access (E-UTRA); Medium Access Control (MAC) protocol specification (Release 12), Dec. 2013, 57 pages.
3GPP TS 36.212 V12.0.0 (Dec. 2013), 3rd Generation Partnership Project; Technical Specification Group Radio Access Network; Evolved Universal Terrestrial Radio Access (E-UTRA); Multiplexing and channel coding (Release 12), Dec. 2013, 88 pages.
Huawei, HiSilicon, Considerations on timing for D2D [online], 3GPP TSG-RAN WG 1#75 R1-135047, San Francisco, USA, Nov. 11-15, 2013, 5 pages.
LG Electronics, Discussion on D2D signal transmission and reception timing [online], 3GPP TSG-RAN WG1#76b R1-141359, Shenzhen, China, Mar. 31-Apr. 4, 2014, 6 pages.
Huawei, HiSilicon, Timing signaling for D2D communication [online], 3GPP TSG-RAN WG1#76b R1-141596, Shenzhen, China, Mar. 31-Apr. 4, 2014, 5 pages.
Huawei, HiSilicon, Timing signaling for D2D communication [online], 3GPP TSG-RAN WG1#77 R1-141930,Seoul, Korea, May 19-23, 2014, 5 pages.
3GPP TS 36.201 V11.1.0 (Dec. 2012), 3rd Generation Partnership Project; Technical Specification Group Radio Access Network; Evolved Universal Terrestrial Radio Access (E-UTRA); LTE physical layer; General description (Release 11), Dec. 2012, 13 pages.
3GPP TS 36.214 V11.1.0 (Dec. 2012), 3rd Generation Partnership Project; Technical Specification Group Radio Access Network; Evolved Universal Terrestrial Radio Access (E-UTRA); Physical layer; Measurements (Release 11), Dec. 2012,14 pages.

* cited by examiner

300

```
A third user equipment sends a first message to a first user equipment,
where the first message is used to trigger the first user equipment to
determine, according to the first message, a first timing advance for      ~ S310
the first user equipment to detect a D2D signal sent by a second user
equipment
```

```
The third user equipment sends a reference signal to the first user
equipment, where the reference signal is used to determine a reference
time for the first user equipment to detect the D2D signal sent by the     ~ S320
second user equipment, where a cell to which the third user equipment
belongs is the same as a cell to which the second user equipment
belongs
```

```
A first base station sends a first message to a first user equipment,
where the first user equipment is a user equipment served by the first
base station, and the first message is used to trigger the first user
equipment to determine, according to the first message, a first timing     ~ S410
advance for the first user equipment to detect a D2D signal sent by a
second user equipment
```

```
The first base station sends a reference signal to the first user
equipment, where the reference signal is used to determine a reference
time for the first user equipment to detect the D2D signal sent by the     ~ S420
second user equipment
```

FIG. 4

METHOD FOR DETECTING DEVICE-TO-DEVICE SIGNAL, USER EQUIPMENT, AND BASE STATION

CROSS REFERENCE TO RELATED APPLICATIONS

This application is a continuation of U.S. patent application Ser. No. 14/907,227 filed on Jan. 22, 2016, which is a national stage of International Application No. PCT/CN2014/073818 filed on Mar. 21, 2014. Both of the aforementioned applications are hereby incorporated by reference in their entireties.

TECHNICAL FIELD

The present invention relates to the communications field, and in particular, to a method for detecting a device-to-device signal, a user equipment, and a base station in the communications field.

BACKGROUND

Device-to-device (Device-to-Device, "D2D" for short) communication refers to direct communication performed between two devices. A device-to-device proximity service (Device to Device Proximity Service, "D2D ProSe" for short) has become a research subject in a Long Term Evolution (Long Term Evolution, "LTE" for short) Rel. 12 system of the 3rd Generation Partnership Project (3rd Generation Partnership Project, "3GPP" for short), and D2D communication is supported in systems starting from the Rel. 12 system.

In a conventional solution design, a user equipment (User Equipment, "UE" for short) receives various signals, such as a control signal or a data signal, that are sent only by a base station. Therefore, the user equipment determines, according to a reference signal sent by the base station, a time for detecting a signal. However, in D2D communication, factors such as a distance between user equipments need to be considered. If the user equipment detects the D2D signal only according to the time determined by using the reference signal sent by the base station, the detection may fail.

SUMMARY

Embodiments of the present invention provide a method for detecting a device-to-device signal, a user equipment, and a base station, which can improve a D2D signal detection success rate of a user equipment.

According to a first aspect, a method for detecting a device-to-device D2D signal is provided, where the method includes: receiving, by a first user equipment, a first message; determining, by the first user equipment according to the first message, a first timing advance for the first user equipment to detect a D2D signal sent by a second user equipment; determining, by the first user equipment, a reference time according to a received reference signal; determining, by the first user equipment according to the first timing advance and the reference time, a first time for detecting the D2D signal; and detecting, by the first user equipment, the D2D signal at the first time.

With reference to the first aspect, in a first possible implementation manner of the first aspect, the receiving, by a first user equipment, a first message includes: receiving, by the first user equipment, the first message sent by a first base station, where the first base station is a base station serving the first user equipment, and the first message includes the first timing advance; where the reference signal is sent by the first base station.

With reference to the first possible implementation manner of the first aspect, in a second possible implementation manner of the first aspect, the first timing advance is a timing advance for sending uplink data by the first user equipment.

With reference to the first aspect, in a third possible implementation manner of the first aspect, the receiving, by a first user equipment, a first message includes: receiving, by the first user equipment, the first message sent by a first base station, where the first base station is a base station serving the first user equipment, and the first message includes first mapping information between multiple user equipments and multiple timing advances; and the determining, by the first user equipment according to the first message, a first timing advance for the first user equipment to detect a D2D signal sent by a second user equipment includes: determining, by the first user equipment according to the first mapping information, a timing advance corresponding to the second user equipment, and using the timing advance corresponding to the second user equipment as the first timing advance; where the reference signal is sent by the first base station.

With reference to the first aspect, in a fourth possible implementation manner of the first aspect, the receiving, by a first user equipment, a first message includes: receiving, by the first user equipment, the first message sent by the second user equipment, where the first message includes a second timing advance for sending the D2D signal by the second user equipment.

With reference to the fourth possible implementation manner of the first aspect, in a fifth possible implementation manner of the first aspect, the determining, by the first user equipment according to the first message, a first timing advance for the first user equipment to detect a D2D signal sent by a second user equipment includes: determining, by the first user equipment, that the second timing advance is the first timing advance; where the reference signal is sent by a first base station, and the first base station is a base station serving the first user equipment.

With reference to the fourth possible implementation manner of the first aspect, in a sixth possible implementation manner of the first aspect, the determining, by the first user equipment according to the first message, a first timing advance for the first user equipment to detect a D2D signal sent by a second user equipment includes: determining, by the first user equipment, that the second timing advance is the first timing advance; and the determining, by the first user equipment, a reference time according to a received reference signal includes: determining, by the first user equipment, a first resource that is used when the second user equipment sends the first message; determining, by the first user equipment according to the first resource and second mapping information between multiple resources and multiple cells, a cell to which the second user equipment belongs; determining, by the first user equipment, a reference signal of the cell to which the second user equipment belongs; and determining, by the first user equipment, the reference time according to the reference signal of the cell to which the second user equipment belongs.

With reference to the fourth possible implementation manner of the first aspect, in a seventh possible implementation manner of the first aspect, the first message further includes an identifier; the determining, by the first user equipment according to the first message, a first timing advance for the first user equipment to detect a D2D signal sent by a second user equipment includes: determining, by the first user equipment, that the second timing advance is the first timing advance; and the determining, by the first user equipment, a reference time according to a received reference signal includes: determining, by the first user equipment according to the identifier, a cell to which the second user equipment belongs; determining, by the first user equipment, a reference signal of the cell to which the second user equipment belongs; and determining, by the first user equipment, the reference time according to the reference signal of the cell to which the second user equipment belongs.

With reference to the fourth possible implementation manner of the first aspect, in an eighth possible implementation manner of the first aspect, the determining, by the first user equipment according to the first message, a first timing advance for the first user equipment to detect a D2D signal sent by a second user equipment includes: determining, by the first user equipment, the first timing advance according to the second timing advance and a time increment that is preset on the first user equipment; where the reference signal is sent by a first base station, and the first base station is a base station serving the first user equipment.

With reference to the fourth possible implementation manner of the first aspect, in a ninth possible implementation manner of the first aspect, before the determining, by the first user equipment according to the first message, a first timing advance for the first user equipment to detect a D2D signal sent by a second user equipment, the method further includes: receiving, by the first user equipment, a second message sent by a first base station, where the first base station is a base station serving the first user equipment, and the second message includes a third timing advance determined by the first base station; and the determining, by the first user equipment according to the first message, a first timing advance for the first user equipment to detect a D2D signal sent by a second user equipment includes: determining, by the first user equipment, the first timing advance according to the second timing advance and the third timing advance; where the reference signal is sent by the first base station.

With reference to the fourth possible implementation manner of the first aspect, in a tenth possible implementation manner of the first aspect, before the determining, by the first user equipment according to the first message, a first timing advance for the first user equipment to detect a D2D signal sent by a second user equipment, the method further includes: receiving, by the first user equipment, a second message sent by a first base station, where the first base station is a base station serving the first user equipment, and the second message includes third mapping information between multiple cells and multiple timing advances; and the determining, by the first user equipment according to the first message, a first timing advance for the first user equipment to detect a D2D signal sent by a second user equipment includes: determining, by the first user equipment, a first resource that is used when the second user equipment sends the first message; determining, by the first user equipment according to the first resource and second mapping information between multiple resources and multiple cells, a cell to which the second user equipment belongs; determining, by the first user equipment according to the third mapping information, a timing advance corresponding to the cell to which the second user equipment belongs; and determining, by the first user equipment, the first timing advance according to the second timing advance and the timing advance corresponding to the cell to which the second user equipment belongs; where the reference signal is sent by the first base station.

With reference to the fourth possible implementation manner of the first aspect, in an eleventh possible implementation manner of the first aspect, the first message further includes an identifier; before the determining, by the first user equipment according to the first message, a first timing advance for the first user equipment to detect a D2D signal sent by a second user equipment, the method further includes: receiving, by the first user equipment, a second message sent by a first base station, where the first base station is a base station serving the first user equipment, and the second message includes third mapping information between multiple cells and multiple timing advances; and the determining, by the first user equipment according to the first message, a first timing advance for the first user equipment to detect a D2D signal sent by a second user equipment includes: determining, by the first user equipment according to the identifier, a cell to which the second user equipment belongs; determining, by the first user equipment according to the third mapping information, a timing advance corresponding to the cell to which the second user equipment belongs; and determining, by the first user equipment, the first timing advance according to the second timing advance and the timing advance corresponding to the cell to which the second user equipment belongs; where the reference signal is sent by the first base station.

With reference to any one implementation manner of the ninth to eleventh possible implementation manners of the first aspect, in a twelfth possible implementation manner of the first aspect, the receiving, by the first user equipment, a second message sent by a first base station includes: receiving, by the first user equipment, the second message that is sent by the first base station by using downlink control information signaling, master information block signaling, system information block signaling, D2D synchronizing channel signaling, or radio resource control protocol signaling.

With reference to the first aspect, in a thirteenth possible implementation manner of the first aspect, the receiving, by a first user equipment, a first message includes: receiving, by the first user equipment, the first message sent by a first base station, where the first base station is a base station serving the first user equipment, and the first message includes third mapping information between multiple cells and multiple timing advances; before the determining, by the first user equipment according to the first message, a first timing advance for the first user equipment to detect a D2D signal sent by a second user equipment, the method further includes: receiving, by the first user equipment, a second message sent by the second user equipment; and the determining, by the first user equipment according to the first message, a first timing advance for the first user equipment to detect a D2D signal sent by a second user equipment includes: determining, by the first user equipment according to the second message, a cell to which the second user equipment belongs; and determining, by the first user equipment according to the third mapping information, a timing advance corresponding to the cell to which the second user equipment belongs, and determining that the timing advance corresponding to the cell to which the second user equipment belongs is the first timing advance; where the reference signal is sent by the first base station.

With reference to the thirteenth possible implementation manner of the first aspect, in a fourteenth possible implementation manner of the first aspect, the second message includes an identifier; and the determining, by the first user equipment according to the second message, a cell to which the second user equipment belongs includes: determining, by the first user equipment according to the identifier, the cell to which the second user equipment belongs.

With reference to the thirteenth possible implementation manner of the first aspect, in a fifteenth possible implementation manner of the first aspect, the determining, by the first user equipment according to the second message, a cell to which the second user equipment belongs includes: determining, by the first user equipment, a second resource that is used when the second user equipment sends the second message; and determining, by the first user equipment according to the second resource and second mapping information between multiple resources and multiple cells, the cell to which the second user equipment belongs.

With reference to the first aspect, in a sixteenth possible implementation manner of the first aspect, the receiving, by a first user equipment, a first message includes: receiving, by the first user equipment, the first message sent by a third user equipment, where a cell to which the third user equipment belongs is the same as a cell to which the second user equipment belongs, and the first message includes the first timing advance; before the determining, by the first user equipment, a reference time according to a received reference signal, the method further includes: receiving, by the first user equipment, a second message sent by the second user equipment; and the determining, by the first user equipment, a reference time according to a received reference signal includes: determining, by the first user equipment according to the second message, the cell to which the second user equipment belongs; determining, by the first user equipment according to the cell to which the second user equipment belongs, a reference signal sent by the third user equipment; and determining, by the first user equipment, the reference time according to the reference signal sent by the third user equipment.

With reference to the sixteenth possible implementation manner of the first aspect, in a seventeenth possible implementation manner of the first aspect, the second message includes an identifier; and the determining, by the first user equipment according to the second message, the cell to which the second user equipment belongs includes: determining, by the first user equipment according to the identifier, the cell to which the second user equipment belongs.

With reference to the sixteenth possible implementation manner of the first aspect, in an eighteenth possible implementation manner of the first aspect, the determining, by the first user equipment according to the second message, the cell to which the second user equipment belongs includes: determining, by the first user equipment, a second resource that is used when the second user equipment sends the second message; and determining, by the first user equipment according to the second resource and second mapping information between multiple resources and multiple cells, the cell to which the second user equipment belongs.

With reference to the first aspect, in a nineteenth possible implementation manner of the first aspect, the receiving, by a first user equipment, a first message includes: receiving, by the first user equipment, the first message sent by a first base station, where the first base station is a base station serving the first user equipment, and the first message includes fourth mapping information between multiple resources and multiple timing advances; and the determining, by the first user equipment according to the first message, a first timing advance for the first user equipment to detect a D2D signal sent by a second user equipment includes: determining, by the first user equipment, a third resource that is used when the D2D signal is detected; and determining, by the first user equipment according to the third resource and the fourth mapping information, a timing advance corresponding to the third resource, and using the timing advance corresponding to the third resource as the first timing advance; where the reference signal is sent by the first base station.

With reference to any one implementation manner of the first to third possible implementation manners, the thirteenth to fifteenth possible implementation manners, and the nineteenth possible implementation manner of the first aspect, in a twentieth possible implementation manner of the first aspect, the receiving, by the first user equipment, the first message sent by a first base station includes: receiving, by the first user equipment, the first message that is sent by the first base station by using downlink control information signaling, master information block signaling, system information block signaling, D2D synchronizing channel signaling, or radio resource control protocol signaling.

With reference to the first aspect, in a twenty-first possible implementation manner of the first aspect, the receiving, by a first user equipment, a first message includes: receiving, by the first user equipment, the first message sent by a third user equipment, where a cell to which the third user equipment belongs is the same as a cell to which the second user equipment belongs, and the first message includes fourth mapping information between multiple resources and multiple timing advances; and the determining, by the first user equipment according to the first message, a first timing advance for the first user equipment to detect a D2D signal sent by a second user equipment includes: determining, by the first user equipment, a third resource that is used when the D2D signal is detected; and determining, by the first user equipment according to the third resource and the fourth mapping information, a timing advance corresponding to the third resource, and using the timing advance corresponding to the third resource as the first timing advance; where the reference signal is sent by the third user equipment.

With reference to the first aspect, in a twenty-second possible implementation manner of the first aspect, the receiving, by a first user equipment, a first message includes: receiving, by the first user equipment, the first message sent by a third user equipment, where a cell to which the third user equipment belongs is the same as a cell to which the second user equipment belongs, and the first message includes the first timing advance; where the reference signal is sent by the third user equipment.

With reference to any one implementation manner of the sixteenth to eighteenth possible implementation manners, the twenty-first possible implementation manner, and the twenty-second possible implementation manner of the first aspect, in a twenty-third possible implementation manner of the first aspect, the receiving, by the first user equipment, the first message sent by a third user equipment includes: receiving, by the first user equipment, the first message that is sent by the third user equipment by using downlink control information signaling, master information block signaling, system information block signaling, D2D synchronizing channel signaling, or radio resource control protocol signaling.

According to a second aspect, a method for detecting a device-to-device D2D signal is provided, where the method includes: generating, by a second user equipment, a first message; and sending, by the second user equipment, the first message to a first user equipment, where the first message is used to trigger the first user equipment to determine, according to the first message, a first timing advance for the first user equipment to detect a D2D signal sent by the second user equipment.

With reference to the second aspect, in a first possible implementation manner of the second aspect, the first message includes a second timing advance for sending the D2D signal by the second user equipment and/or an identifier used to indicate a cell to which the second user equipment belongs.

According to a third aspect, a method for detecting a device-to-device D2D signal is provided, where the method includes: sending, by a third user equipment, a first message to a first user equipment, where the first message is used to trigger the first user equipment to determine, according to the first message, a first timing advance for the first user equipment to detect a D2D signal sent by a second user equipment; and sending, by the third user equipment, a reference signal to the first user equipment, where the reference signal is used to determine a reference time for the first user equipment to detect the D2D signal sent by the second user equipment; where a cell to which the third user equipment belongs is the same as a cell to which the second user equipment belongs.

With reference to the third aspect, in a first possible implementation manner of the third aspect, the first message includes the first timing advance for detecting the D2D signal by the first user equipment.

With reference to the third aspect, in a second possible implementation manner of the third aspect, the first message includes mapping information between multiple resources and multiple timing advances.

With reference to the third aspect or either one implementation manner of the first to second possible implementation manners of the third aspect, in a third possible implementation manner of the third aspect, the sending, by a third user equipment, a first message to a first user equipment includes: sending, by the third user equipment, the first message to the first user equipment by using downlink control information signaling, master information block signaling, system information block signaling, D2D synchronizing channel signaling, or radio resource control protocol signaling.

According to a fourth aspect, a method for detecting a device-to-device D2D signal is provided, where the method includes: sending, by a first base station, a first message to a first user equipment, where the first user equipment is a user equipment served by the first base station, and the first message is used to trigger the first user equipment to determine, according to the first message, a first timing advance for the first user equipment to detect a D2D signal sent by a second user equipment; and sending, by the first base station, a reference signal to the first user equipment, where the reference signal is used to determine a reference time for the first user equipment to detect the D2D signal sent by the second user equipment.

With reference to the fourth aspect, in a first possible implementation manner of the fourth aspect, the first message includes the first timing advance or a timing advance for sending uplink data by the first user equipment.

With reference to the fourth aspect, in a second possible implementation manner of the fourth aspect, the first message includes mapping information, where the mapping information is mapping information between multiple user equipments and multiple timing advances, mapping information between multiple cells and multiple timing advances, or mapping information between multiple resources and multiple timing advances.

With reference to the fourth aspect or either one implementation manner of the first to second possible implementation manners of the fourth aspect, in a third possible implementation manner of the fourth aspect, the sending, by a first base station, a first message to a first user equipment includes: sending, by the first base station, the first message to the first user equipment by using downlink control information signaling, master information block signaling, system information block signaling, D2D synchronizing channel signaling, or radio resource control protocol signaling.

According to a fifth aspect, a first user equipment is provided, where the first user equipment includes: a first receiving module, configured to receive a first message; a first determining module, configured to determine, according to the first message received by the first receiving module, a first timing advance for the first user equipment to detect a D2D signal sent by a second user equipment; a second receiving module, configured to receive a reference signal; a second determining module, configured to determine a reference time according to the reference signal received by the second receiving module; a third determining module, configured to determine, according to the first timing advance determined by the first determining module and the reference time determined by the second determining module, a first time for detecting the D2D signal; and a detecting module, configured to detect the D2D signal at the first time determined by the third determining module.

With reference to the fifth aspect, in a first possible implementation manner of the fifth aspect, the first receiving module is specifically configured to: receive the first message sent by a first base station, where the first base station is a base station serving the first user equipment, and the first message includes the first timing advance; where the reference signal received by the second receiving module is sent by the first base station.

With reference to the first possible implementation manner of the fifth aspect, in a second possible implementation manner of the fifth aspect, the first timing advance received by the first receiving module is a timing advance for sending uplink data by the first user equipment.

With reference to the fifth aspect, in a third possible implementation manner of the fifth aspect, the first receiving module is specifically configured to: receive the first message sent by a first base station, where the first base station is a base station serving the first user equipment, and the first message includes first mapping information between multiple user equipments and multiple timing advances; and the first determining module is specifically configured to: determine, according to the first mapping information received by the first receiving module, a timing advance corresponding to the second user equipment, and use the timing advance corresponding to the second user equipment as the first timing advance; where the reference signal received by the second receiving module is sent by the first base station.

With reference to the fifth aspect, in a fourth possible implementation manner of the fifth aspect, the first receiving module is specifically configured to: receive the first message sent by the second user equipment, where the first message includes a second timing advance for sending the D2D signal by the second user equipment.

With reference to the fourth possible implementation manner of the fifth aspect, in a fifth possible implementation manner of the fifth aspect, the first determining module is specifically configured to: determine that the second timing advance received by the first receiving module is the first timing advance; where the reference signal received by the second receiving module is sent by a first base station, and the first base station is a base station serving the first user equipment.

With reference to the fourth possible implementation manner of the fifth aspect, in a sixth possible implementation manner of the fifth aspect, the first determining module is specifically configured to: determine that the second timing advance received by the first receiving module is the first timing advance; and the second determining module is specifically configured to: determine a first resource that is used when the second user equipment sends the first message; determine, according to the first resource and second mapping information between multiple resources and multiple cells, a cell to which the second user equipment belongs; determine a reference signal of the cell to which the second user equipment belongs; and determine the reference time according to the reference signal of the cell to which the second user equipment belongs.

With reference to the fourth possible implementation manner of the fifth aspect, in a seventh possible implementation manner of the fifth aspect, the first message received by the first receiving module further includes an identifier; the first determining module is specifically configured to: determine that the second timing advance received by the first receiving module is the first timing advance; and the second determining module is specifically configured to: determine, according to the identifier, a cell to which the second user equipment belongs; determine a reference signal of the cell to which the second user equipment belongs; and determine the reference time according to the reference signal of the cell to which the second user equipment belongs.

With reference to the fourth possible implementation manner of the fifth aspect, in an eighth possible implementation manner of the fifth aspect, the first determining module is specifically configured to: determine the first timing advance according to the second timing advance received by the first receiving module and a time increment that is preset on the first user equipment; where the reference signal received by the second receiving module is sent by a first base station, and the first base station is a base station serving the first user equipment.

With reference to the fourth possible implementation manner of the fifth aspect, in a ninth possible implementation manner of the fifth aspect, the first user equipment further includes: a third receiving module, configured to receive a second message sent by a first base station, where the first base station is a base station serving the first user equipment, and the second message includes a third timing advance determined by the first base station; and the first determining module is specifically configured to: determine the first timing advance according to the second timing advance received by the first receiving module and the third timing advance received by the third receiving module; where the reference signal received by the second receiving module is sent by the first base station.

With reference to the fourth possible implementation manner of the fifth aspect, in a tenth possible implementation manner of the fifth aspect, the first user equipment further includes: a third receiving module, configured to receive a second message sent by a first base station, where the first base station is a base station serving the first user equipment, and the second message includes third mapping information between multiple cells and multiple timing advances; and the first determining module is specifically configured to: determine a first resource that is used when the second user equipment sends the first message; determine, according to the first resource and second mapping information between multiple resources and multiple cells, a cell to which the second user equipment belongs; determine, according to the third mapping information received by the third receiving module, a timing advance corresponding to the cell to which the second user equipment belongs; and determine the first timing advance according to the second timing advance received by the first receiving module and the timing advance corresponding to the cell to which the second user equipment belongs; where the reference signal received by the second receiving module is sent by the first base station.

With reference to the fourth possible implementation manner of the fifth aspect, in an eleventh possible implementation manner of the fifth aspect, the first message received by the first receiving module further includes an identifier; the first user equipment further includes: a third receiving module, configured to receive a second message sent by a first base station, where the first base station is a base station serving the first user equipment, and the second message includes third mapping information between multiple cells and multiple timing advances; and the first determining module is specifically configured to: determine, according to the identifier, a cell to which the second user equipment belongs; determine, according to the third mapping information received by the third receiving module, a timing advance corresponding to the cell to which the second user equipment belongs; and determine the first timing advance according to the second timing advance received by the first receiving module and the timing advance corresponding to the cell to which the second user equipment belongs; where the reference signal received by the second receiving module is sent by the first base station.

With reference to any one implementation manner of the ninth to eleventh possible implementation manners of the fifth aspect, in a twelfth possible implementation manner of the fifth aspect, the third receiving module is specifically configured to: receive the second message that is sent by the first base station by using downlink control information signaling, master information block signaling, system information block signaling, D2D synchronizing channel signaling, or radio resource control protocol signaling.

With reference to the fifth aspect, in a thirteenth possible implementation manner of the fifth aspect, the first receiving module is specifically configured to: receive the first message sent by a first base station, where the first base station is a base station serving the first user equipment, and the first message includes third mapping information between multiple cells and multiple timing advances; the first user equipment further includes: a third receiving module, configured to receive a second message sent by the second user equipment; and the first determining module is specifically configured to: determine, according to the second message received by the third receiving module, a cell to which the second user equipment belongs; and determine, according to the third mapping information received by the first receiving module, a timing advance corresponding to the cell to which the second user equipment belongs, and determine that the timing advance corresponding to the cell to which the second user equipment belongs is the first timing advance; where the reference signal received by the second receiving module is sent by the first base station.

With reference to the thirteenth possible implementation manner of the fifth aspect, in a fourteenth possible implementation manner of the fifth aspect, the second message received by the third receiving module includes an identifier; and the first determining module is specifically configured to: determine, according to the identifier, the cell to which the second user equipment belongs; and determine, according to the third mapping information received by the first receiving module, the timing advance corresponding to the cell to which the second user equipment belongs, and determine that the timing advance corresponding to the cell to which the second user equipment belongs is the first timing advance.

With reference to the thirteenth possible implementation manner of the fifth aspect, in a fifteenth possible implementation manner of the fifth aspect, the first determining module is specifically configured to: determine a second resource that is used when the second user equipment sends the second message; determine, according to the second resource and second mapping information between multiple resources and multiple cells, the cell to which the second user equipment belongs; and determine, according to the third mapping information received by the first receiving module, the timing advance corresponding to the cell to which the second user equipment belongs, and determine that the timing advance corresponding to the cell to which the second user equipment belongs is the first timing advance.

With reference to the fifth aspect, in a sixteenth possible implementation manner of the fifth aspect, the first receiving module is specifically configured to: receive the first message sent by a third user equipment, where a cell to which the third user equipment belongs is the same as a cell to which the second user equipment belongs, and the first message includes the first timing advance; the first user equipment further includes: a third receiving module, configured to receive a second message sent by the second user equipment; and the second determining module is specifically configured to: determine, according to the second message received by the third receiving module, the cell to which the second user equipment belongs; determine, according to the cell to which the second user equipment belongs, a reference signal sent by the third user equipment; and determine the reference time according to the reference signal sent by the third user equipment.

With reference to the sixteenth possible implementation manner of the fifth aspect, in a seventeenth possible implementation manner of the fifth aspect, the second message received by the third receiving module includes an identifier; and the second determining module is specifically configured to: determine, according to the identifier, the cell to which the second user equipment belongs; determine, according to the cell to which the second user equipment belongs, the reference signal sent by the third user equipment; and determine the reference time according to the reference signal sent by the third user equipment.

With reference to the sixteenth possible implementation manner of the fifth aspect, in an eighteenth possible implementation manner of the fifth aspect, the second determining module is specifically configured to: determine a second resource that is used when the second user equipment sends the second message; determine, according to the second resource and second mapping information between multiple resources and multiple cells, the cell to which the second user equipment belongs; determine, according to the cell to which the second user equipment belongs, the reference signal sent by the third user equipment; and determine the reference time according to the reference signal sent by the third user equipment.

With reference to the fifth aspect, in a nineteenth possible implementation manner of the fifth aspect, the first receiving module is specifically configured to: receive the first message sent by a first base station, where the first base station is a base station serving the first user equipment, and the first message includes fourth mapping information between multiple resources and multiple timing advances; and the first determining module is specifically configured to: determine a third resource that is used when the D2D signal is detected; and determine, according to the third resource and the fourth mapping information that is received by the first receiving module, a timing advance corresponding to the third resource, and use the timing advance corresponding to the third resource as the first timing advance; where the reference signal received by the second receiving module is sent by the first base station.

With reference to any one implementation manner of the first to third possible implementation manners, the thirteenth to fifteenth possible implementation manners, and the nineteenth possible implementation manner of the fifth aspect, in a twentieth possible implementation manner of the fifth aspect, the first receiving module is specifically configured to: receive the first message that is sent by the first base station by using downlink control information signaling, master information block signaling, system information block signaling, D2D synchronizing channel signaling, or radio resource control protocol signaling.

With reference to the fifth aspect, in a twenty-first possible implementation manner of the fifth aspect, the first receiving module is specifically configured to: receive the first message sent by a third user equipment, where a cell to which the third user equipment belongs is the same as a cell to which the second user equipment belongs, and the first message includes fourth mapping information between multiple resources and multiple timing advances; and the first determining module is specifically configured to: determine a third resource that is used when the D2D signal is detected; and determine, according to the third resource and the fourth mapping information that is received by the first receiving module, a timing advance corresponding to the third resource, and use the timing advance corresponding to the third resource as the first timing advance; where the reference signal received by the second receiving module is sent by the third user equipment.

With reference to the fifth aspect, in a twenty-second possible implementation manner of the fifth aspect, the first receiving module is specifically configured to: receive the first message sent by a third user equipment, where a cell to which the third user equipment belongs is the same as a cell to which the second user equipment belongs, and the first message includes the first timing advance; where the reference signal received by the second receiving module is sent by the third user equipment.

With reference to any one implementation manner of the sixteenth to eighteenth possible implementation manners, the twenty-first possible implementation manner, and the twenty-second possible implementation manner of the fifth aspect, in a twenty-third possible implementation manner of the fifth aspect, the first receiving module is specifically configured to: receive the first message that is sent by the third user equipment by using downlink control information signaling, master information block signaling, system information block signaling, D2D synchronizing channel signaling, or radio resource control protocol signaling.

According to a sixth aspect, a second user equipment is provided, where the second user equipment includes: a generating module, configured to generate a first message; and a sending module, configured to send the first message generated by the generating module to a first user equipment, where the first message is used to trigger the first user equipment to determine, according to the first message, a first timing advance for the first user equipment to detect a D2D signal sent by the second user equipment.

With reference to the sixth aspect, in a first possible implementation manner of the sixth aspect, the first message generated by the generating module includes a second timing advance for sending the D2D signal by the second user equipment and/or an identifier used to indicate a cell to which the second user equipment belongs.

According to a seventh aspect, a third user equipment is provided, where the third user equipment includes: a first sending module, configured to send a first message to a first user equipment, where the first message is used to trigger the first user equipment to determine, according to the first message, a first timing advance for the first user equipment to detect a D2D signal sent by a second user equipment; and a second sending module, configured to send a reference signal to the first user equipment, where the reference signal is used to determine a reference time for the first user equipment to detect the D2D signal sent by the second user equipment; where a cell to which the third user equipment belongs is the same as a cell to which the second user equipment belongs.

With reference to the seventh aspect, in a first possible implementation manner of the seventh aspect, the first message sent by the first sending module includes the first timing advance for detecting the D2D signal by the first user equipment.

With reference to the seventh aspect, in a second possible implementation manner of the seventh aspect, the first message sent by the first sending module includes mapping information between multiple resources and multiple timing advances.

With reference to the seventh aspect or either one implementation manner of the first to second possible implementation manners of the seventh aspect, in a third possible implementation manner of the seventh aspect, the first sending module is specifically configured to: send the first message to the first user equipment by using downlink control information signaling, master information block signaling, system information block signaling, D2D synchronizing channel signaling, or radio resource control protocol signaling.

According to an eighth aspect, a first base station is provided, where the first base station includes: a first sending module, configured to send a first message to a first user equipment, where the first user equipment is a user equipment served by the first base station, and the first message is used to trigger the first user equipment to determine, according to the first message, a first timing advance for the first user equipment to detect a D2D signal sent by a second user equipment; and a second sending module, configured to send a reference signal to the first user equipment, where the reference signal is used to determine a reference time for the first user equipment to detect the D2D signal sent by the second user equipment.

With reference to the eighth aspect, in a first possible implementation manner of the eighth aspect, the first message sent by the first sending module includes the first timing advance or a timing advance for sending uplink data by the first user equipment.

With reference to the eighth aspect, in a second possible implementation manner of the eighth aspect, the first message sent by the first sending module includes mapping information, where the mapping information is mapping information between multiple user equipments and multiple timing advances, mapping information between multiple cells and multiple timing advances, or mapping information between multiple resources and multiple timing advances.

With reference to the eighth aspect or either one implementation manner of the first to second possible implementation manners of the eighth aspect, in a third possible implementation manner of the eighth aspect, the first sending module is specifically configured to: send the first message to the first user equipment by using downlink control information signaling, master information block signaling, system information block signaling, D2D synchronizing channel signaling, or radio resource control protocol signaling.

Based on the foregoing technical solutions, the method for detecting a device-to-device signal, the user equipment, and the base station according to the embodiments of the present invention improve a D2D signal detection success rate of the user equipment.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 shows a schematic flowchart of a method for detecting a device-to-device signal according to another embodiment of the present invention;

FIG. 4 shows a schematic flowchart of a method for detecting a device-to-device signal according to another embodiment of the present invention;

DETAILED DESCRIPTION

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that in the embodiments of the present invention, a user equipment (User Equipment, "UE" for short) may be called a terminal (Terminal), a mobile station (Mobile Station, "MS" for short), or a mobile user equipment (Mobile Terminal), and the like. The user equipment may be a mobile phone (or called a "cellular" phone) or a computer having a mobile user equipment, and the like. For example, the user equipment may also be a portable, pocket-sized, handheld, computer built-in, or in-vehicle mobile apparatus.

It should also be understood that in the embodiments of the present invention, a base station may be an evolved NodeB (evolutional Node B, "eNB or e-NodeB" for short) in LTE, or may be a NodeB (Node B) in WCDMA, or may be a base transceiver station (Base Transceiver Station, "BTS" for short) in GSM or CDMA, or may be a cluster head (Cluster Head) of a user cluster in D2D communication, which is not limited in the embodiments of the present invention.

Figure 1:
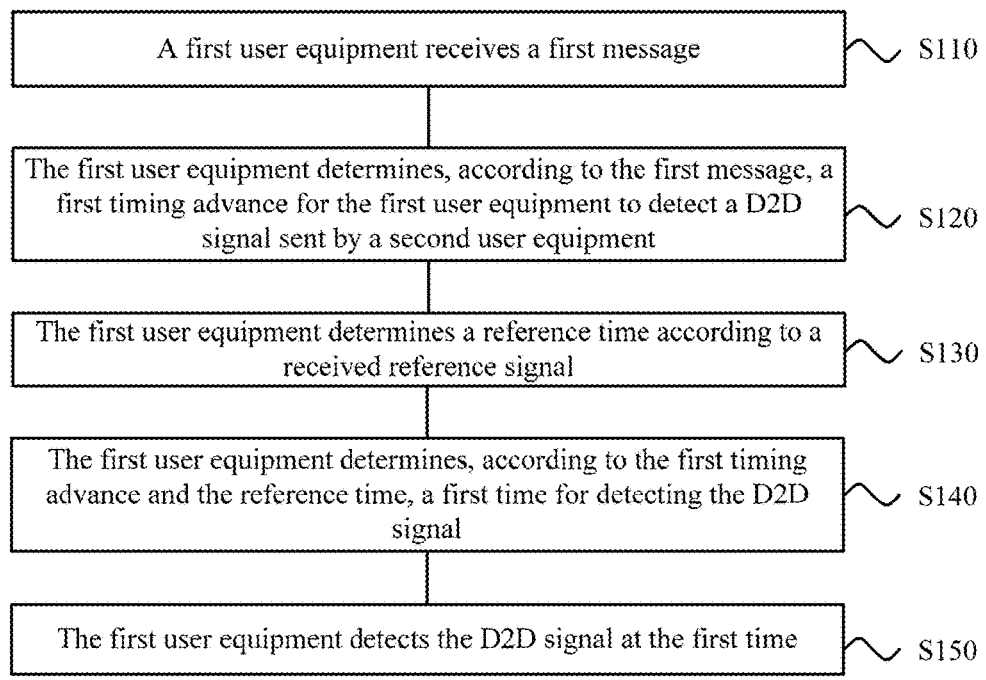
FIG. 1 shows a schematic flowchart of a method for detecting a device-to-device signal according to an embodiment of the present invention.

FIG. 1 shows a method 100 for detecting a D2D signal according to an embodiment of the present invention, where the method 100 may be executed by a first user equipment. As shown in FIG. 1, the method 100 includes:

S110. A first user equipment receives a first message.

S120. The first user equipment determines, according to the first message, a first timing advance for the first user equipment to detect a D2D signal sent by a second user equipment.

S130. The first user equipment determines a reference time according to a received reference signal.

S140. The first user equipment determines, according to the first timing advance and the reference time, a first time for detecting the D2D signal.

S150. The first user equipment detects the D2D signal at the first time.

Therefore, in the method for detecting a device-to-device signal according to the embodiment of the present invention, a first user equipment may determine, by receiving a timing advance and a reference time, a time for detecting a D2D signal, so that when the first user equipment detects the D2D signal at the time, a D2D signal detection success rate can be improved.

It should be understood that the first message received by the first user equipment may come from a base station serving the first user equipment, the second user equipment sending the D2D signal, or a third user equipment that belongs to a same cell as the second user equipment. The first user equipment determines, according to the first message, the first timing advance for detecting the D2D signal sent by the second user equipment, where the first message may include multiple types of content. For example, the first message may include a timing advance that is determined by the base station and is for the first user equipment to receive the D2D signal sent by the second user equipment, a timing advance for sending uplink data by the first user equipment, or a timing advance for sending the D2D signal by the second user equipment. The first message may further include mapping information between multiple user equipments and multiple timing advances, mapping information between multiple cells and multiple timing advances, mapping information between multiple resources and multiple timing advances, or the like. The first message may further include some other reference information for determining to detect the D2D signal, for example, an identifier used to indicate a cell, which is not limited in the embodiment of the present invention. In addition, when the first user equipment determines, according to the first message, the first timing advance for detecting the D2D signal, reference may be made to a second message coming from the base station or second user equipment, which is not limited in the embodiment of the present invention.

It should also be understood that the reference signal received by the first user equipment is used to determine the reference time for detecting the D2D signal. The reference signal may come from the base station serving the first user equipment or from the third user equipment that belongs to the same cell as the second user equipment.

After determining the first timing advance and the reference time, the first user equipment may determine, according to the first timing advance and the reference time, the first time for detecting the D2D signal sent by the second user equipment, and start to detect the D2D signal at the first time. The following mainly describes how to determine the first timing advance and how to determine the reference time.

In the specification, for ease of description, the first user equipment and second user equipment are two user equipments performing D2D communication, where the first user equipment is a user equipment detecting the D2D signal, and the second user equipment is a user equipment sending the D2D signal. The third user equipment is a user equipment that belongs to a same cell as the first user equipment. A first base station is a base station serving the first user equipment. The first timing advance is a timing advance for the first user equipment to detect the D2D signal. The reference time is a benchmark time referred to by the first user equipment for detecting the D2D signal. The first time is a time for the first user equipment to start to detect the D2D signal.

In an embodiment, that a first user equipment receives a first message includes: receiving, by the first user equipment, the first message sent by a first base station, where the first base station is a base station serving the first user equipment, and the first message includes the first timing advance; where the reference signal is sent by the first base station.

Specifically, when a cell to which the first user equipment belongs is the same as a cell to which the second user equipment belongs, the first user equipment receives the first message sent by the first base station, where the first message includes the first timing advance. The first timing advance may be a timing advance that is determined by the first base station and is for the first user equipment to detect the D2D signal sent by the second user equipment. When determining the timing advance for the first user equipment to detect the D2D signal sent by the second user equipment, the first base station may refer to distance information between the first user equipment and the first base station and/or distance information between the second user equipment and the first base station, or distance information of a user equipment farthest away from the first base station among user equipments served by the first base station; and may further refer to timing advance information for sending uplink data by the first user equipment and/or timing advance information for sending uplink data by the second user equipment, or information about a maximum timing advance in timing advances for sending uplink data by a user equipment among user equipments served by the first base station. The first user equipment further needs to receive the reference signal sent by the first base station, where the reference signal determines the reference time for detecting the D2D signal.

Optionally, the first timing advance may be a timing advance for sending uplink data by the first user equipment. The timing advance for sending uplink data by the first user equipment is a timing advance that is used when the first user equipment sends uplink data to the first base station. The first user equipment uses the timing advance that is used when the first user equipment sends uplink data to the first base station, as the timing advance for detecting the D2D signal sent by the second user equipment, so that the D2D signal sent by the second user equipment may fall within a receiving time window of the first user equipment. Thereby, the complete D2D signal sent by the second user equipment may be acquired, and the D2D signal sent by the second user equipment may be further detected. The first user equipment further needs to receive the reference signal sent by the first base station, where the reference signal determines the reference time for detecting the D2D signal. The reference time may be a receiving time for the first user equipment to receive a signal sent by the first base station, and is used to provide a time reference for receiving the D2D signal.

In an embodiment, that a first user equipment receives a first message includes: receiving, by the first user equipment, the first message sent by a first base station, where the first base station is a base station serving the first user equipment, and the first message includes first mapping information between multiple user equipments and multiple timing advances; and that the first user equipment determines, according to the first message, a first timing advance for the first user equipment to detect a D2D signal sent by a second user equipment includes: determining, by the first user equipment according to the first mapping information, a timing advance corresponding to the second user equipment, and using the timing advance corresponding to the second user equipment as the first timing advance; where the reference signal is sent by the first base station.

Specifically, when a cell to which the first user equipment belongs is the same as a cell to which the second user equipment belongs, the first user equipment receives the first message sent by the first base station, where the first message includes the first mapping information between multiple user equipments and multiple timing advances. The first mapping information may be mapping information between multiple user equipments in the cell to which the first user equipment belongs and timing advances corresponding to the user equipments. When determining the timing advance corresponding to each user equipment in the first mapping information, the first base station may refer to distance information between the first user equipment and the first base station and/or distance information between multiple user equipments and the first base station, or distance information of a user equipment farthest away from the first base station among user equipments served by the first base station; and may further refer to timing advance information for sending uplink data by the first user equipment and/or timing advance information for sending uplink data by multiple user equipments, or information about a maximum timing advance in timing advances for sending uplink data by a user equipment among user equipments served by the first base station.

In specific implementation, a user equipment in the first mapping information may be represented by an identifier used to indicate the user equipment. The first user equipment may determine, by using an identifier of the second user equipment, the timing advance corresponding to the second user equipment, and use the timing advance corresponding to the second user equipment as the first timing advance.

The first user equipment further needs to receive the reference signal sent by the first base station, where the reference signal determines the reference time for detecting the D2D signal. The user equipment in the first mapping information may also be represented by other information, which is not limited in the embodiment of the present invention.

In an embodiment, that a first user equipment receives a first message includes: receiving, by the first user equipment, the first message sent by the second user equipment, where the first message includes a second timing advance for sending the D2D signal by the second user equipment. The first user equipment may use the second timing advance as the first timing advance, or refer to the second timing advance to determine the first timing advance, which is not limited in the embodiment of the present invention.

Optionally, that the first user equipment determines, according to the first message, a first timing advance for the first user equipment to detect a D2D signal sent by a second user equipment includes: determining, by the first user equipment, that the second timing advance is the first timing advance; where the reference signal is sent by a first base station, and the first base station is a base station serving the first user equipment.

Specifically, when the cell to which the first user equipment belongs is the same as the cell to which the second user equipment belongs, the first user equipment may determine that the timing advance for sending the D2D signal by the second user equipment is the first timing advance. In addition, the first user equipment further needs to receive the reference signal sent by the first base station, where the reference signal determines the reference time for detecting the D2D signal.

Optionally, that the first user equipment determines, according to the first message, a first timing advance for the first user equipment to detect a D2D signal sent by a second user equipment includes: determining, by the first user equipment, that the second timing advance is the first timing advance; and that the first user equipment determines a reference time according to a received reference signal includes: determining, by the first user equipment, a first resource that is used when the second user equipment sends the first message; determining, by the first user equipment according to the first resource and second mapping information between multiple resources and multiple cells, the cell to which the second user equipment belongs; determining, by the first user equipment, a reference signal of the cell to which the second user equipment belongs; and determining, by the first user equipment, the reference time according to the reference signal of the cell to which the second user equipment belongs.

Generally, a time deviation exists between cells. If the cell to which the first user equipment belongs is different from the cell to which the second user equipment belongs, but the first user equipment still determines the first time according to a reference time included in a reference signal corresponding to the cell to which the first user equipment belongs, the determined first time is inaccurate. Therefore, the reference signal corresponding to the cell to which the second user equipment belongs should be determined, and the reference signal corresponding to the cell to which the second user equipment belongs is used to determine the reference time for detecting the D2D signal.

It should be understood that the first user equipment may obtain, from the base station, second mapping information between multiple resources and multiple cells, where the second mapping information reflects a situation of resource allocation by a system. By using the second mapping information, the first user equipment may learn information such as time resources, frequency resources, and codeword resources allocated by the system to each cell. The first user equipment may further acquire the second mapping information by other means, which is not limited in the embodiment of the present invention.

When the second user equipment sends the first message to the first user equipment, the first user equipment determines the first resource that is used when the second user equipment sends the first message. According to the first resource and the second mapping information, the cell to which the second user equipment belongs may be determined. Further, the first user equipment may acquire the reference signal of the cell to which the second user equipment belongs, and determine the reference time according to the reference signal.

Alternatively, the reference time may also be determined by other means. For example, when sending the first message to the first user equipment, the second user equipment may add an identifier to the first message, where the identifier is used to indicate the cell to which the second user equipment belongs.

Correspondingly, that the first user equipment determines, according to the first message, a first timing advance for the first user equipment to detect a D2D signal sent by a second user equipment includes: determining, by the first user equipment, that the second timing advance is the first timing advance; and that the first user equipment determines a reference time according to a received reference signal includes: determining, by the first user equipment according to the identifier, the cell to which the second user equipment belongs; determining, by the first user equipment, a reference signal of the cell to which the second user equipment belongs; and determining, by the first user equipment, the reference time according to the reference signal of the cell to which the second user equipment belongs.

Optionally, that the first user equipment determines, according to the first message, a first timing advance for the first user equipment to detect a D2D signal sent by a second user equipment includes: determining, by the first user equipment, the first timing advance according to the second timing advance and a time increment that is preset on the first user equipment; where the reference signal is sent by a first base station, and the first base station is a base station serving the first user equipment.

Specifically, when the cell to which the first user equipment belongs is different from the cell to which the second user equipment belongs, the used reference time is still a reference time of the cell to which the first user equipment belongs, that is, the reference signal is sent by the first base station. To compensate for a time deviation between the cell to which the first user equipment belongs and the cell to which the second user equipment belongs, when the first timing advance is calculated, a time increment may be added to the second timing advance. The time increment may be preset on the first user equipment, and a deviation value corresponding to a cell that has a greatest time deviation from the cell to which the first user equipment belongs or a value greater than the deviation value may be selected as the time increment, which is not limited in the embodiment of the present invention.

Optionally, when the cell to which the first user equipment belongs is different from the cell to which the second user equipment belongs, the first user equipment further acquires a timing advance from the first base station in addition to receiving the second timing advance from the second user equipment. The timing advance determined by the first base station may refer to the time deviation between the cell to which the first user equipment belongs and the cell to which the second user equipment belongs, and the like. The first user equipment determines the first timing advance according to the two timing advances respectively sent by the second user equipment and the first base station. The first user equipment further needs to receive the reference signal sent by the first base station, where the reference signal determines the reference time for detecting the D2D signal.

Correspondingly, before S120, the method 100 further includes: receiving, by the first user equipment, a second message sent by a first base station, where the first base station is a base station serving the first user equipment, and the second message includes a third timing advance determined by the first base station; and that the first user equipment determines, according to the first message, a first timing advance for the first user equipment to detect a D2D signal sent by a second user equipment includes: determining, by the first user equipment, the first timing advance according to the second timing advance and the third timing advance; where the reference signal is sent by the first base station.

Alternatively, the timing advance may also be acquired from the first base station in other implementation manners. For example, third mapping information is acquired from the first base station, and an applicable timing advance is determined according to the third mapping information. The third mapping information may be mapping information between multiple cells and multiple timing advances. The first user equipment may determine, according to a first resource that is used when the second user equipment sends the first message, the cell to which the second user equipment belongs. Thereby, a timing advance corresponding to the cell to which the second user equipment belongs is found in the third mapping information. A manner of determining, according to the resource, the cell to which the user equipment belongs, is similar to that described above. The first user equipment further needs to receive the reference signal sent by the first base station, where the reference signal determines the reference time for detecting the D2D signal.

Correspondingly, before S120, the method 100 further includes: receiving, by the first user equipment, a second message sent by a first base station, where the first base station is a base station serving the first user equipment, and the second message includes third mapping information between multiple cells and multiple timing advances; and that the first user equipment determines, according to the first message, a first timing advance for the first user equipment to detect a D2D signal sent by a second user equipment includes: determining, by the first user equipment, a first resource that is used when the second user equipment sends the first message; determining, by the first user equipment according to the first resource and second mapping information between multiple resources and multiple cells, the cell to which the second user equipment belongs; determining, by the first user equipment according to the third mapping information, a timing advance corresponding to the cell to which the second user equipment belongs; and determining, by the first user equipment, the first timing advance according to the second timing advance and the timing advance corresponding to the cell to which the second user equipment belongs; where the reference signal is sent by the first base station.

Alternatively, the timing advance may also be acquired from the first base station in other implementation manners. For another example, third mapping information is acquired from the first base station, and an applicable timing advance is determined according to the third mapping information. The third mapping information may be mapping information between multiple cells and multiple timing advances. The first user equipment determines, by using the identifier added by the second user equipment in the first message, the cell to which the second user equipment belongs. Thereby, a timing advance corresponding to the cell to which the second user equipment belongs is found in the third mapping information. A manner of determining, according to the identifier, the cell to which the second user equipment belongs is similar to that described above. The first user equipment further needs to receive the reference signal sent by the first base station, where the reference signal determines the reference time for detecting the D2D signal.

Correspondingly, before S120, the method 100 further includes: receiving, by the first user equipment, a second message sent by a first base station, where the first base station is a base station serving the first user equipment, and the second message includes third mapping information between multiple cells and multiple timing advances; and that the first user equipment determines, according to the first message, a first timing advance for the first user equipment to detect a D2D signal sent by a second user equipment includes: determining, by the first user equipment according to the identifier, the cell to which the second user equipment belongs; determining, by the first user equipment according to the third mapping information, a timing advance corresponding to the cell to which the second user equipment belongs; and determining, by the first user equipment, the first timing advance according to the second timing advance and the timing advance corresponding to the cell to which the second user equipment belongs; where the reference signal is sent by the first base station.

In an embodiment, the first user equipment receives the first message sent by a first base station, where the first base station is a base station serving the first user equipment, and the first message includes third mapping information between multiple cells and multiple timing advances; before the first user equipment determines, according to the first message, a first timing advance for the first user equipment to detect a D2D signal sent by a second user equipment, the method further includes: receiving, by the first user equipment, a second message sent by the second user equipment; and that the first user equipment determines, according to the first message, a first timing advance for the first user equipment to detect a D2D signal sent by a second user equipment includes: determining, by the first user equipment according to the second message, the cell to which the second user equipment belongs; and determining, by the first user equipment according to the third mapping information, a timing advance corresponding to the cell to which the second user equipment belongs, and determining that the timing advance corresponding to the cell to which the second user equipment belongs is the first timing advance; where the reference signal is sent by the first base station. The first user equipment determines, according to the reference signal, the reference time for detecting the D2D signal. In the third mapping information, the timing advance determined by the base station may refer to distance information between the first user equipment and the second user equipment and/or the time deviation between the cell to which the first user equipment belongs and the cell to which the second user equipment belongs.

Optionally, the cell to which the second user equipment belongs may be determined according to an identifier by referring to the foregoing description. Correspondingly, the second message includes an identifier; and that the first user equipment determines, according to the second message, the cell to which the second user equipment belongs includes: determining, by the first user equipment according to the identifier, the cell to which the second user equipment belongs.

Alternatively, the cell to which the second user equipment belongs may be determined according to a first resource by referring to the foregoing description. Correspondingly, that the first user equipment determines, according to the second message, the cell to which the second user equipment belongs includes: determining, by the first user equipment, a second resource that is used when the second user equipment sends the second message; and determining, by the first user equipment according to the second resource and second mapping information between multiple resources and multiple cells, the cell to which the second user equipment belongs.

In an embodiment, that a first user equipment receives a first message includes: receiving, by the first user equipment, the first message sent by a third user equipment, where a cell to which the third user equipment belongs is the same as a cell to which the second user equipment belongs, and the first message includes the first timing advance; before the first user equipment determines a reference time according to a received reference signal, the method 100 further includes: receiving, by the first user equipment, a second message sent by the second user equipment; and that the first user equipment determines a reference time according to a received reference signal includes: determining, by the first user equipment according to the second message, the cell to which the second user equipment belongs; determining, by the first user equipment according to the cell to which the second user equipment belongs, a reference signal sent by the third user equipment; and determining, by the first user equipment, the reference time according to the reference signal sent by the third user equipment.

Specifically, because a cell to which the first user equipment belongs is different from the cell to which the second user equipment belongs, the first user equipment cannot receive a message sent by a base station serving the second user equipment. Therefore, in this embodiment, a timing advance determined by the base station serving the second user equipment and third user equipment may be forwarded by the third user equipment. A reference signal generated by the base station serving the second user equipment and third user equipment is also forwarded by the third user equipment, so that the first user equipment determines, according to the reference signal, the reference time for detecting the D2D signal. The timing advance determined by the base station serving the second user equipment and third user equipment may refer to timing advance information for sending uplink data by the second user equipment, or information about a maximum timing advance in timing advances for sending uplink data by a user equipment among user equipments served by the base station serving the second user equipment and third user equipment, or the like.

Optionally, the cell to which the second user equipment belongs may be determined according to an identifier by referring to the foregoing description. Correspondingly, the second message includes an identifier; and that the first user equipment determines, according to the second message, the cell to which the second user equipment belongs includes: determining, by the first user equipment according to the identifier, the cell to which the second user equipment belongs.

Alternatively, the cell to which the second user equipment belongs may be determined according to a second resource by referring to the foregoing description. Correspondingly, that the first user equipment determines, according to the second message, the cell to which the second user equipment belongs includes: determining, by the first user equipment, a second resource that is used when the second user equipment sends the second message; and determining, by the first user equipment according to the second resource and second mapping information between multiple resources and multiple cells, the cell to which the second user equipment belongs.

In an embodiment, that a first user equipment receives a first message includes: receiving, by the first user equipment, the first message sent by a first base station, where the first base station is a base station serving the first user equipment, and the first message includes fourth mapping information between multiple resources and multiple timing advances; and that the first user equipment determines, according to the first message, a first timing advance for the first user equipment to detect a D2D signal sent by a second user equipment includes: determining, by the first user equipment, a third resource that is used when the D2D signal is detected; and determining, by the first user equipment according to the third resource and the fourth mapping information, a timing advance corresponding to the third resource, and using the timing advance corresponding to the third resource as the first timing advance; where the reference signal is sent by the first base station.

Specifically, by referring to distance information between the first user equipment and other user equipments and/or time deviations between a cell to which the first user equipment belongs and cells to which other user equipments belong, and the like, the first base station may determine multiple timing advances corresponding to the cells. However, the first user equipment may also determine, according to a resource that is used when the D2D signal sent by the second user equipment is detected, a cell to which the second user equipment belongs. Therefore, multiple resources and multiple timing advances may form the fourth mapping information. According to the third resource that is used when the second user equipment sends the D2D signal, the timing advance corresponding to the third resource is found in the fourth mapping information and used as the first timing advance. In addition, the first user equipment further needs to receive the reference signal sent by the first base station, where the reference signal determines the reference time for detecting the D2D signal.

In an embodiment, that a first user equipment receives a first message includes: receiving, by the first user equipment, the first message sent by a third user equipment, where a cell to which the third user equipment belongs is the same as a cell to which the second user equipment belongs, and the first message includes fourth mapping information between multiple resources and multiple timing advances; and that the first user equipment determines, according to the first message, a first timing advance for the first user equipment to detect a D2D signal sent by a second user equipment includes: determining, by the first user equipment, a third resource that is used when the D2D signal is detected; and determining, by the first user equipment according to the third resource and the fourth mapping information, a timing advance corresponding to the third resource, and using the timing advance corresponding to the third resource as the first timing advance; where the reference signal is sent by the third user equipment.

This embodiment differs from the foregoing embodiment in that the first message is sent by the third user equipment that belongs to the same cell as the second user equipment. The first message may be determined by a base station serving the second user equipment and third user equipment. The base station serving the second user equipment and third user equipment may refer to timing advance information for sending uplink data by the second user equipment, or information about a maximum timing advance in timing advances for sending uplink data by a user equipment among user equipments served by the base station serving the second user equipment and third user equipment. Therefore, multiple resources and multiple timing advances used when the D2D signal is detected may form the fourth mapping information. According to a resource that is used when the second user equipment sends the D2D signal, a timing advance corresponding to the resource is found in the fourth mapping information and used as the first timing advance. In addition, the first user equipment further receives the reference signal from the third user equipment to determine the reference time for detecting the D2D signal.

In an embodiment, that a first user equipment receives a first message includes: receiving, by the first user equipment, the first message sent by a third user equipment, where a cell to which the third user equipment belongs is the same as a cell to which the second user equipment belongs, and the first message includes the first timing advance; where the reference signal is sent by the third user equipment.

In this implementation manner, the third user equipment is also a forwarding device, the first timing advance included in the first message forwarded by the third user equipment is determined by a base station serving the second user equipment and third user equipment. The reference signal forwarded by the third user equipment also comes from the base station serving the second user equipment and third user equipment. When determining the first timing advance, the base station serving the second user equipment and third user equipment may refer to timing advance information for sending uplink data by the second user equipment, or information about a maximum timing advance in timing advances for sending uplink data by a user equipment among user equipments served by the base station serving the second user equipment and third user equipment, or the like. In addition, the first user equipment further needs to receive the reference signal from the third user equipment to determine the reference time for detecting the D2D signal.

It should be understood that the first message or second message sent by the first base station as mentioned in the specification may be delivered by the first base station by using downlink control information ("Downlink Control Information", "DCI" for short) signaling, master information block ("Master Information Block", "MIB" for short) signaling, system information block ("System Information Block", "SIB" for short) signaling, D2D synchronizing channel ("D2D Synchronizing Channel", "D2DSCH" for short) signaling, or radio resource control protocol ("Radio Resource Control", "RRC" for short) signaling. The first message sent by the third user equipment as mentioned in the specification may also be delivered by the third user equipment by using downlink control information signaling, master information block signaling, system information block signaling, D2D synchronizing channel signaling, or radio resource control protocol signaling.

Therefore, in the method for detecting a device-to-device signal according to the embodiment of the present invention, a first user equipment may determine, by receiving a timing advance and a reference time, a time for detecting a D2D signal, so that when the first user equipment detects the D2D signal at the time, a D2D signal detection success rate can be improved.

The method 100 for detecting a D2D signal according to the embodiment of the present invention is described in detail above with reference to FIG. 1 from a perspective of a first user equipment detecting a D2D signal. A method for detecting a D2D signal according to an embodiment of the present invention is hereinafter described with reference to FIG. 2 to FIG. 4 from a perspective of a second user equipment, a perspective of a third user equipment, and a perspective of a first base station respectively.

Figure 2:
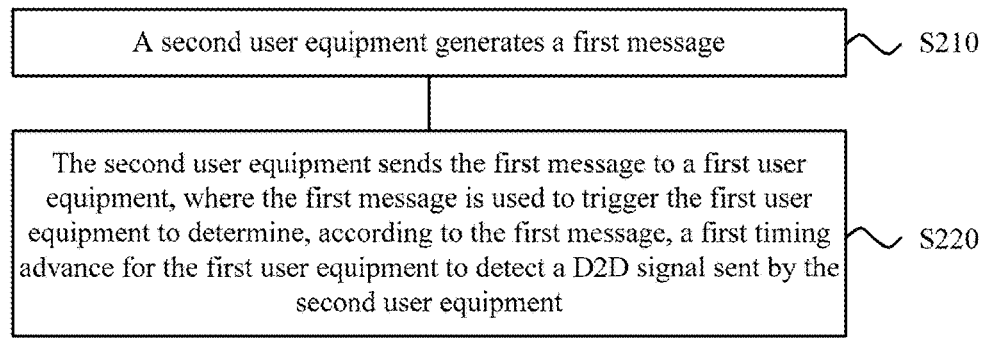
FIG. 2 shows a schematic flowchart of a method for detecting a device-to-device signal according to an embodiment of the present invention.

As shown in FIG. 2, a method 200 for detecting a D2D signal according to an embodiment of the present invention may be executed by a second user equipment, where the method 200 includes:

S210. A second user equipment generates a first message.

S220. The second user equipment sends the first message to a first user equipment, where the first message is used to trigger the first user equipment to determine, according to the first message, a first timing advance for the first user equipment to detect a D2D signal sent by the second user equipment.

Therefore, in the method for detecting a D2D signal according to the embodiment of the present invention, a second user equipment may trigger, by generating and sending a first message, a first user equipment to determine, according to the first message, a first timing advance for detecting a D2D signal sent by the second user equipment, and further determine a first time for detecting the D2D signal, which can improve a D2D signal detection success rate.

In an embodiment, the first message includes a timing advance for sending the D2D signal by the second user equipment and/or an identifier used to indicate a cell to which the second user equipment belongs.

Optionally, the first user equipment may use the timing advance for sending the D2D signal by the second user equipment as the first timing advance. In addition, the first user equipment further needs to receive a reference signal sent by a first base station, where the reference signal determines a reference time for detecting the D2D signal. The first user equipment may determine, according to the first timing advance and the reference time, the first time for detecting the D2D signal sent by the second user equipment.

Optionally, the first message may further include the identifier used to indicate the cell to which the second user equipment belongs, in addition to the timing advance for sending the D2D signal by the second user equipment. When a cell to which the first user equipment belongs is different from the cell to which the second user equipment belongs, the first user equipment needs to determine the cell to which the second user equipment belongs, and further determine a used timing advance. By using the identifier, the cell to which the second user equipment belongs may be determined more conveniently. The first message may also include only one identifier used to determine the cell to which the second user equipment belongs, which is not limited in the embodiment of the present invention.

Therefore, in the method for detecting a D2D signal according to the embodiment of the present invention, a second user equipment may trigger, by generating and sending a first message, a first user equipment to determine, according to the first message, a first timing advance for detecting a D2D signal sent by the second user equipment, and further determine a first time for detecting the D2D signal, which can improve a D2D signal detection success rate.

As shown in FIG. 3, a method 300 for detecting a D2D signal according to an embodiment of the present invention may be executed by a third user equipment, where the method 300 includes:

S310. A third user equipment sends a first message to a first user equipment, where the first message is used to trigger the first user equipment to determine, according to the first message, a first timing advance for the first user equipment to detect a D2D signal sent by a second user equipment.

S320. The third user equipment sends a reference signal to the first user equipment, where the reference signal is used to determine a reference time for the first user equipment to detect the D2D signal sent by the second user equipment;

where a cell to which the third user equipment belongs is the same as a cell to which the second user equipment belongs.

Therefore, in the method for detecting a D2D signal according to the embodiment of the present invention, a third user equipment may enable, by sending a first message and a reference signal to a first user equipment, the first user equipment to determine, according to the first message and the reference signal, a first time for detecting a D2D signal, which can improve a D2D signal detection success rate.

Specifically, when a cell to which the first user equipment belongs is different from the cell to which the second user equipment belongs, the first user equipment cannot receive a message sent by a base station serving the second user equipment. Therefore, the first message that includes a timing advance determined by a base station serving the second user equipment and third user equipment may be forwarded by the third user equipment. A reference signal sent by the base station serving the second user equipment and third user equipment may also be forwarded by the third user equipment.

In an embodiment, the first message includes the first timing advance for detecting the D2D signal by the first user equipment. The first user equipment determines, according to the first timing advance and the reference time, the first time for detecting the D2D signal.

In another embodiment, the first message includes mapping information between multiple resources and multiple timing advances; the first user equipment may determine, according to the mapping information, the first timing advance for detecting the D2D signal, and further determine, according to the first timing advance and the reference time, the first time for detecting the D2D signal.

It should be understood that the first message sent by the third user equipment to the first user equipment may be delivered by using downlink control information signaling, master information block signaling, system information block signaling, D2D synchronizing channel signaling, or radio resource control protocol signaling.

Therefore, in the method for detecting a D2D signal according to the embodiment of the present invention, a third user equipment may trigger, by sending a first message and a reference signal to a first user equipment, the first user equipment to determine, according to the first message and the reference signal, a first time for detecting a D2D signal, which can improve a D2D signal detection success rate.

As shown in FIG. 4, a method 400 for detecting a D2D signal according to an embodiment of the present invention may be executed by a first base station, where the method 400 includes:

S410. A first base station sends a first message to a first user equipment, where the first user equipment is a user equipment served by the first base station, and the first message is used to trigger the first user equipment to determine, according to the first message, a first timing advance for the first user equipment to detect a D2D signal sent by a second user equipment.

S420. The first base station sends a reference signal to the first user equipment, where the reference signal is used to determine a reference time for the first user equipment to detect the D2D signal sent by the second user equipment.

Therefore, in the method for detecting a D2D signal according to the embodiment of the present invention, a first base station may trigger, by sending a first message and a reference signal to a first user equipment, the first user equipment to determine, according to the first message and the reference signal, a first time for detecting a D2D signal, which can improve a D2D signal detection success rate.

In an embodiment, the first message includes the first timing advance or a timing advance for sending uplink data by the first user equipment. When the first message includes the first timing advance, the first user equipment determines, according to the first timing advance and the reference signal, the first time for detecting the D2D signal. When the first message includes the timing advance for sending uplink data by the first user equipment, the timing advance for sending uplink data by the first user equipment is used as the first advance, and then the first time for detecting the D2D signal is determined according to the first timing advance and the reference signal.

In another embodiment, the first message includes mapping information, where the mapping information is mapping information between multiple user equipments and multiple timing advances, mapping information between multiple cells and multiple timing advances, or mapping information between multiple resources and multiple timing advances. The first user equipment may determine, according to the mapping information, the first timing advance for detecting the D2D signal, and further determine, according to the first timing advance and the reference time, the first time for detecting the D2D signal.

It should be understood that the first message sent by the first base station to the first user equipment may be delivered by using downlink control information signaling, master information block signaling, system information block signaling, D2D synchronizing channel signaling, or radio resource control protocol signaling.

Therefore, in the method for detecting a D2D signal according to the embodiment of the present invention, a first base station may trigger, by sending a first message and a reference signal to a first user equipment, the first user equipment to determine, according to the first message and the reference signal, a first time for detecting a D2D signal, which can improve a D2D signal detection success rate.

It should be understood that in each embodiment of the present invention, sequence numbers of the foregoing processes do not necessarily represent execution sequences, and that the execution sequences of the processes should be determined according to functions and internal logic of the processes and do not constitute any limitation on the implementation processes of the embodiments of the present invention.

The method for detecting a D2D signal according to the embodiments of the present invention is described in detail above with reference to FIG. 1 to FIG. 4. A user equipment and a base station according to the embodiments of the present invention are hereinafter described in detail with reference to FIG. 5 to FIG. 8.

Figure 5:
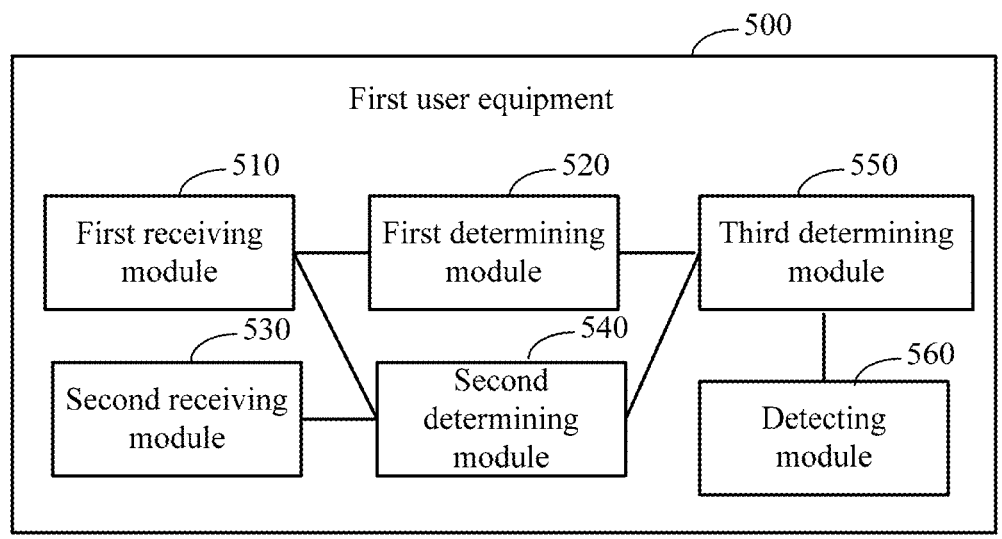
FIG. 5 shows a schematic block diagram of a first user equipment according to an embodiment of the present invention.

FIG. 5 shows a schematic block diagram of a first user equipment 500 according to an embodiment of the present invention. As shown in FIG. 5, the first user equipment 500 includes:

a first receiving module 510, configured to receive a first message;

a first determining module 520, configured to determine, according to the first message received by the first receiving module 510, a first timing advance for the first user equipment to detect a D2D signal sent by a second user equipment;

a second receiving module 530, configured to receive a reference signal;

a second determining module 540, configured to determine a reference time according to the received reference signal;

a third determining module 550, configured to determine, according to the first timing advance determined by the first determining module 520 and the reference time determined by the second determining module 540, a first time for detecting the D2D signal; and a detecting module 560, configured to detect the D2D signal at the first time determined by the third determining module 550.

Therefore, the first user equipment provided by the embodiment of the present invention may determine, by receiving a timing advance and a reference time, a time for detecting a D2D signal, so that when the first user equipment detects the D2D signal at the time, a D2D signal detection success rate can be improved.

In an embodiment, the first receiving module 510 is specifically configured to:

receive the first message sent by a first base station, where the first base station is a base station serving the first user equipment, and the first message includes the first timing advance;

where the reference signal received by the second receiving module 530 is sent by the first base station.

Optionally, the first timing advance received by the first receiving module 510 is a timing advance for sending uplink data by the first user equipment.

In an embodiment, the first receiving module 510 is specifically configured to:

receive the first message sent by a first base station, where the first base station is a base station serving the first user equipment, and the first message includes first mapping information between multiple user equipments and multiple timing advances; and the first determining module 520 is specifically configured to:

determine, according to the first mapping information received by the first receiving module 510, a timing advance corresponding to the second user equipment, and use the timing advance corresponding to the second user equipment as the first timing advance;

where the reference signal received by the second receiving module 530 is sent by the first base station.

In an embodiment, the first receiving module 510 is specifically configured to:

receive the first message sent by the second user equipment, where the first message includes a second timing advance for sending the D2D signal by the second user equipment.

Optionally, the first determining module 520 is specifically configured to:

determine that the second timing advance received by the first receiving module 510 is the first timing advance;

where the reference signal received by the second receiving module 530 is sent by a first base station, and the first base station is a base station serving the first user equipment.

Optionally, the first determining module 520 is specifically configured to:

determine that the second timing advance received by the first receiving module 510 is the first timing advance; and the second determining module 540 is specifically configured to:

determine a first resource that is used when the second user equipment sends the first message;

determine, according to the first resource and second mapping information between multiple resources and multiple cells, a cell to which the second user equipment belongs;

determine a reference signal of the cell to which the second user equipment belongs; and determine the reference time according to the reference signal of the cell to which the second user equipment belongs.

Optionally, the first message received by the first receiving module 510 further includes an identifier;

the first determining module 520 is specifically configured to:

determine that the second timing advance received by the first receiving module 510 is the first timing advance; and the second determining module 540 is specifically configured to:

determine, according to the identifier, a cell to which the second user equipment belongs;

determine a reference signal of the cell to which the second user equipment belongs; and determine the reference time according to the reference signal of the cell to which the second user equipment belongs.

Optionally, the first determining module 520 is specifically configured to:

determine the first timing advance according to the second timing advance received by the first receiving module 510 and a time increment that is preset on the first user equipment;

where the reference signal received by the second receiving module 530 is sent by a first base station, and the first base station is a base station serving the first user equipment.

Optionally, the first user equipment further includes:

a third receiving module, configured to receive a second message sent by a first base station, where the first base station is a base station serving the first user equipment, and the second message includes a third timing advance determined by the first base station; and the first determining module 520 is specifically configured to:

determine the first timing advance according to the second timing advance received by the first receiving module 510 and the third timing advance received by the third receiving module;

where the reference signal received by the second receiving module 530 is sent by the first base station.

Optionally, the first user equipment further includes:

a third receiving module, configured to receive a second message sent by a first base station, where the first base station is a base station serving the first user equipment, and the second message includes third mapping information between multiple cells and multiple timing advances; and the first determining module 520 is specifically configured to:

determine a first resource that is used when the second user equipment sends the first message;

determine, according to the first resource and second mapping information between multiple resources and multiple cells, a cell to which the second user equipment belongs;

determine, according to the third mapping information received by the third receiving module, a timing advance corresponding to the cell to which the second user equipment belongs; and determine the first timing advance according to the second timing advance received by the first receiving module 510 and the timing advance corresponding to the cell to which the second user equipment belongs;

where the reference signal received by the second receiving module 530 is sent by the first base station.

Optionally, the first message received by the first receiving module 510 further includes an identifier;

the first user equipment further includes:

a third receiving module, configured to receive a second message sent by a first base station, where the first base station is a base station serving the first user equipment, and the second message includes third mapping information between multiple cells and multiple timing advances; and the first determining module 520 is specifically configured to:

determine, according to the identifier, a cell to which the second user equipment belongs;

determine, according to the third mapping information received by the third receiving module, a timing advance corresponding to the cell to which the second user equipment belongs; and determine the first timing advance according to the second timing advance received by the first receiving module 510 and the timing advance corresponding to the cell to which the second user equipment belongs;

where the reference signal received by the second receiving module 530 is sent by the first base station.

It should be understood that the third receiving module may be specifically configured to:

receive the second message that is sent by the first base station by using downlink control information signaling, master information block signaling, system information block signaling, D2D synchronizing channel signaling, or radio resource control protocol signaling.

In an embodiment, the first receiving module 510 is specifically configured to:

receive the first message sent by a first base station, where the first base station is a base station serving the first user equipment, and the first message includes third mapping information between multiple cells and multiple timing advances;

the first user equipment further includes:

a third receiving module, configured to receive a second message sent by the second user equipment; and the first determining module 520 is specifically configured to:

determine, according to the second message received by the third receiving module, a cell to which the second user equipment belongs; and determine, according to the third mapping information received by the first receiving module 510, a timing advance corresponding to the cell to which the second user equipment belongs, and determine that the timing advance corresponding to the cell to which the second user equipment belongs is the first timing advance;

where the reference signal received by the second receiving module 530 is sent by the first base station.

Optionally, the second message received by the third receiving module includes an identifier; and the first determining module 520 is specifically configured to:

determine, according to the identifier, the cell to which the second user equipment belongs; and determine, according to the third mapping information received by the first receiving module 510, the timing advance corresponding to the cell to which the second user equipment belongs, and determine that the timing advance corresponding to the cell to which the second user equipment belongs is the first timing advance.

Optionally, the first determining module 520 is specifically configured to:

determine a second resource that is used when the second user equipment sends the second message;

determine, according to the second resource and second mapping information between multiple resources and multiple cells, the cell to which the second user equipment belongs; and determine, according to the third mapping information received by the first receiving module 510, the timing advance corresponding to the cell to which the second user equipment belongs, and determine that the timing advance corresponding to the cell to which the second user equipment belongs is the first timing advance.

In an embodiment, the first receiving module 510 is specifically configured to:

receive the first message sent by a third user equipment, where a cell to which the third user equipment belongs is the same as a cell to which the second user equipment belongs, and the first message includes the first timing advance;

the first user equipment further includes:

a third receiving module, configured to receive a second message sent by the second user equipment; and the second determining module 540 is specifically configured to:

determine, according to the second message received by the third receiving module, the cell to which the second user equipment belongs;

determine, according to the cell to which the second user equipment belongs, a reference signal sent by the third user equipment; and determine the reference time according to the reference signal sent by the third user equipment.

Optionally, the second message received by the third receiving module includes an identifier; and the second determining module 540 is specifically configured to:

determine, according to the identifier, the cell to which the second user equipment belongs;

determine, according to the cell to which the second user equipment belongs, the reference signal sent by the third user equipment; and determine the reference time according to the reference signal sent by the third user equipment.

Optionally, the second determining module 540 is specifically configured to:

determine a second resource that is used when the second user equipment sends the second message;

determine, according to the second resource and second mapping information between multiple resources and multiple cells, the cell to which the second user equipment belongs;

determine, according to the cell to which the second user equipment belongs, the reference signal sent by the third user equipment; and determine the reference time according to the reference signal sent by the third user equipment.

In an embodiment, the first receiving module 510 is specifically configured to:

receive the first message sent by a first base station, where the first base station is a base station serving the first user equipment, and the first message includes fourth mapping information between multiple resources and multiple timing advances; and the first determining module 520 is specifically configured to:

determine a third resource that is used when the D2D signal is detected; and determine, according to the third resource and the fourth mapping information that is received by the first receiving module 510, a timing advance corresponding to the third resource, and use the timing advance corresponding to the third resource as the first timing advance;

where the reference signal received by the second receiving module 530 is sent by the first base station.

It should be understood that the first receiving module may be specifically configured to:

receive the first message that is sent by the first base station by using downlink control information signaling, master information block signaling, system information block signaling, D2D synchronizing channel signaling, or radio resource control protocol signaling.

In an embodiment, the first receiving module 510 is specifically configured to:

receive the first message sent by a third user equipment, where a cell to which the third user equipment belongs is the same as a cell to which the second user equipment belongs, and the first message includes fourth mapping information between multiple resources and multiple timing advances; and the first determining module 520 is specifically configured to:

determine a third resource that is used when the D2D signal is detected; and determine, according to the third resource and the fourth mapping information that is received by the first receiving module 510, a timing advance corresponding to the third resource, and use the timing advance corresponding to the third resource as the first timing advance;

where the reference signal received by the second receiving module 530 is sent by the third user equipment.

In an embodiment, the first receiving module 510 is specifically configured to:

receive the first message sent by a third user equipment, where a cell to which the third user equipment belongs is the same as a cell to which the second user equipment belongs, and the first message includes the first timing advance;

where the reference signal received by the second receiving module 530 is sent by the third user equipment.

It should be understood that the first receiving module may be specifically configured to:

receive the first message that is sent by the third user equipment by using downlink control information signaling, master information block signaling, system information block signaling, D2D synchronizing channel signaling, or radio resource control protocol signaling.

It should also be understood that in the embodiment of the present invention, the first user equipment 500 according to the embodiment of the present invention may be corresponding to an entity for executing a method according to an embodiment of the present invention, and that the foregoing and other operations and/or functions of each module in the first user equipment 500 are intended for implementing the corresponding procedure of each method in FIG. 1 to FIG. 4 separately, which is not further described herein for brevity.

Therefore, the first user equipment provided by the embodiment of the present invention may determine, by receiving a timing advance and a reference time, a time for detecting a D2D signal, so that when the first user equipment detects the D2D signal at the time, a D2D signal detection success rate can be improved.

Figure 6:
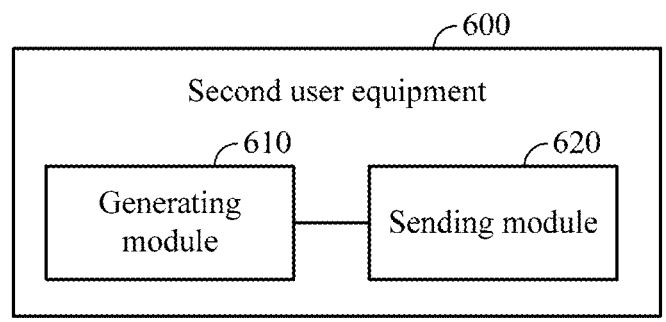
FIG. 6 shows a schematic block diagram of a second user equipment according to an embodiment of the present invention.

FIG. 6 shows a schematic block diagram of a second user equipment 600 according to an embodiment of the present invention. As shown in FIG. 6, the second user equipment 600 includes:

a generating module 610, configured to generate a first message; and a sending module 620, configured to send the first message generated by the generating module 610 to a first user equipment, where the first message is used to trigger the first user equipment to determine, according to the first message, a first timing advance for the first user equipment to detect a D2D signal sent by the second user equipment.

Optionally, in an embodiment, the first message generated by the generating module 610 includes a second timing advance for sending the D2D signal by the second user equipment and/or an identifier used to indicate a cell to which the second user equipment belongs.

It should be understood that in the embodiment of the present invention, the second user equipment 600 according to the embodiment of the present invention may be corresponding to an entity for executing a method according to an embodiment of the present invention, and that the foregoing and other operations and/or functions of each module in the second user equipment 600 are intended for implementing the corresponding procedure of each method in FIG. 1 to FIG. 4 separately, which is not further described herein for brevity.

Therefore, the second user equipment provided by the embodiment of the present invention may trigger, by generating and sending a first message, a first user equipment to determine, according to the first message, a first timing advance for detecting a D2D signal sent by the second user equipment, and further determine a first time for detecting the D2D signal, which can improve a D2D signal detection success rate.

Figure 7:
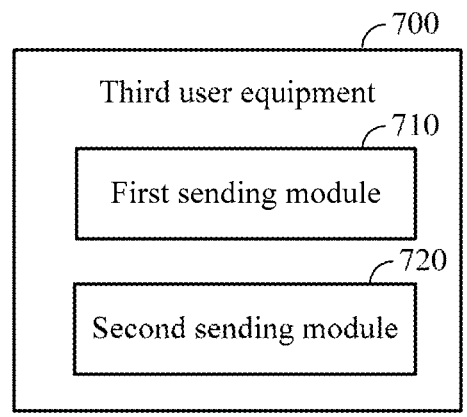
FIG. 7 shows a schematic block diagram of a third user equipment according to an embodiment of the present invention.

FIG. 7 shows a schematic block diagram of a third user equipment 700 according to an embodiment of the present invention. As shown in FIG. 7, the third user equipment 700 includes:

a first sending module 710, configured to send a first message to a first user equipment, where the first message is used to trigger the first user equipment to determine, according to the first message, a first timing advance for the first user equipment to detect a D2D signal sent by a second user equipment; and a second sending module 720, configured to send a reference signal to the first user equipment, where the reference signal is used to determine a reference time for the first user equipment to detect the D2D signal sent by the second user equipment;

where a cell to which the third user equipment 700 belongs is the same as a cell to which the second user equipment belongs.

Optionally, in an embodiment, the first message sent by the first sending module 710 includes the first timing advance for detecting the D2D signal by the first user equipment.

Optionally, in an embodiment, the first message sent by the first sending module 710 includes mapping information between multiple resources and multiple timing advances.

Optionally, the first sending module 710 is specifically configured to:

send the first message to the first user equipment by using downlink control information signaling, master information block signaling, system information block signaling, D2D synchronizing channel signaling, or radio resource control protocol signaling.

It should be understood that in the embodiment of the present invention, the third user equipment 700 according to the embodiment of the present invention may be corresponding to an entity for executing a method according to an embodiment of the present invention, and that the foregoing and other operations and/or functions of each module in the third user equipment 700 are intended for implementing the corresponding procedure of each method in FIG. 1 to FIG. 4 separately, which is not further described herein for brevity.

Therefore, the third user equipment provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

Figure 8:
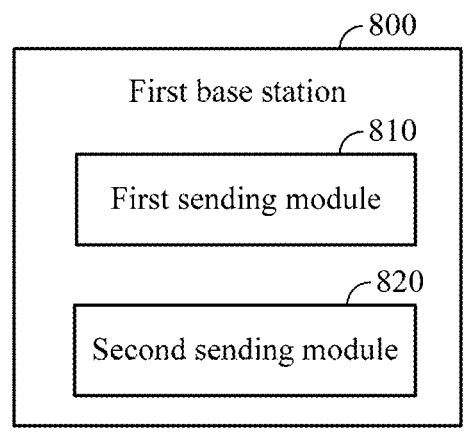
FIG. 8 shows a schematic block diagram of a first base station according to an embodiment of the present invention.

FIG. 8 shows a schematic block diagram of a first base station 800 according to an embodiment of the present invention. As shown in FIG. 8, the first base station 800 includes:

a first sending module 810, configured to send a first message to a first user equipment, where the first user equipment is a user equipment served by the first base station, and the first message is used to trigger the first user equipment to determine, according to the first message, a first timing advance for the first user equipment to detect a D2D signal sent by a second user equipment; and a second sending module 820, configured to send a reference signal to the first user equipment, where the reference signal is used to determine a reference time for the first user equipment to detect the D2D signal sent by the second user equipment.

Optionally, in an embodiment, the first message sent by the first sending module 810 includes the first timing advance or a timing advance for sending uplink data by the first user equipment.

Optionally, in an embodiment, the first message sent by the first sending module 810 includes mapping information, where the mapping information is mapping information between multiple user equipments and multiple timing advances, mapping information between multiple cells and multiple timing advances, or mapping information between multiple resources and multiple timing advances.

Optionally, the first sending module 810 is specifically configured to:

send the first message to the first user equipment by using downlink control information signaling, master information block signaling, system information block signaling, D2D synchronizing channel signaling, or radio resource control protocol signaling.

It should also be understood that in the embodiment of the present invention, the first base station 800 according to the embodiment of the present invention may be corresponding to an entity for executing a method according to an embodiment of the present invention, and that the foregoing and other operations and/or functions of each module in the first base station 800 are intended for implementing the corresponding procedure of each method in FIG. 1 to FIG. 4 separately, which is not further described herein for brevity.

Therefore, the first base station provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

Figure 9:
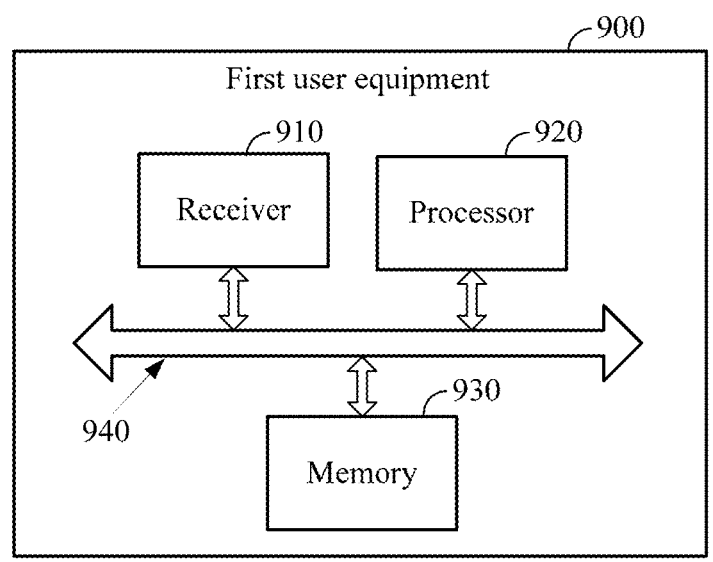
FIG. 9 shows a schematic block diagram of a first user equipment according to another embodiment of the present invention.

As shown in FIG. 9, an embodiment of the present invention further provides a first user equipment 900, where the apparatus 900 includes a receiver 910, a processor 920, a memory 930, and a bus system 940, where the receiver 910, the processor 920, and the memory 930 are connected by using the bus system 940, the memory 930 is configured to store an instruction, and the processor 920 is configured to execute the instruction stored by the memory 930, where the receiver 910 is configured to:

receive a first message; and
the processor 920 is configured to:
determine, according to the first message, a first timing advance for the first user equipment to detect a D2D signal sent by a second user equipment;
determine a reference time according to a received reference signal;
determine, according to the first timing advance and the reference time, a first time for detecting the D2D signal; and
detect the D2D signal at the first time.

Therefore, the first user equipment provided by the embodiment of the present invention may determine, by receiving a timing advance and a reference time, a time for detecting a D2D signal, so that when the first user equipment detects the D2D signal at the time, a D2D signal detection success rate can be improved.

It should be understood that in the embodiment of the present invention, the processor 920 may be a central processing unit (Central Processing Unit, "CPU" for short). The processor 920 may also be a general processor, a digital signal processor (DSP), an application specific integrated circuit (ASIC), a field programmable gate array (FPGA) or a programmable logic device, a discrete gate or a transistor logic device, a discrete hardware assembly, or the like. The general processor may be a microprocessor or the processor may be any conventional processor, or the like.

The memory 930 may include a read-only memory and a random access memory, and provide an instruction and data for the processor 920. A part of the memory 930 may further include a non-volatile random access memory. For example, the memory 930 may further store device type information.

The bus system 940 may further include a power bus, a control bus, a status signal bus, and the like, in addition to a data bus. However, for clear description, various buses in the figure are all marked as the bus system 940.

In an implementation process, each step of the foregoing method may be implemented by using a hardware integrated logic circuit in the processor 920, or by using an instruction in a software form. The steps of the method disclosed in the embodiment of the present invention may be directly reflected as being implemented by a hardware processor, or implemented by a combination of hardware and software modules in the processor. The software module may be located in a mature storage medium in the field such as a random memory, a flash memory, a read-only memory, a programmable read-only memory or an electrically erasable programmable read-only memory, and a register. The storage medium is located in the memory 930, and the processor 920 reads information from the memory 930, and implements the steps of the foregoing method with reference to the hardware of the processor. To avoid repetition, no detailed description is provided herein.

Optionally, in an embodiment, the receiver 910 is specifically configured to:
receive the first message sent by a first base station, where the first base station is a base station serving the first user equipment, and the first message includes the first timing advance;
where the reference signal is sent by the first base station.

Optionally, the first timing advance is a timing advance for sending uplink data by the first user equipment.

Optionally, in an embodiment, the receiver 910 is specifically configured to:
receive the first message sent by a first base station, where the first base station is a base station serving the first user equipment, and the first message includes first mapping information between multiple user equipments and multiple timing advances; and
the processor 920 is specifically configured to:
determine, according to the first mapping information, a timing advance corresponding to the second user equipment, and use the timing advance corresponding to the second user equipment as the first timing advance;
where the reference signal is sent by the first base station.

Optionally, in an embodiment, the receiver 910 is specifically configured to:
receive the first message sent by the second user equipment, where the first message includes a second timing advance for sending the D2D signal by the second user equipment.

The processor 920 is specifically configured to:
determine that the second timing advance is the first timing advance;
where the reference signal is sent by a first base station, and the first base station is a base station serving the first user equipment.

Optionally, the processor 920 is specifically configured to:
determine that the second timing advance is the first timing advance;
determine a first resource that is used when the second user equipment sends the first message;
determine, according to the first resource and second mapping information between multiple resources and multiple cells, a cell to which the second user equipment belongs;
determine a reference signal of the cell to which the second user equipment belongs; and
determine the reference time according to the reference signal of the cell to which the second user equipment belongs.

Optionally, the first message received by the receiver 910 further includes an identifier;

the processor 920 is specifically configured to:
determine that the second timing advance is the first timing advance; and
the determining a reference time according to a received reference signal includes:
determining, according to the identifier, a cell to which the second user equipment belongs;
determining a reference signal of the cell to which the second user equipment belongs; and
determining the reference time according to the reference signal of the cell to which the second user equipment belongs.

Optionally, the processor 920 is specifically configured to:
determine the first timing advance according to the second timing advance and a time increment that is preset on the first user equipment;
where the reference signal is sent by a first base station, and the first base station is a base station serving the first user equipment.

Optionally, the receiver 910 is specifically further configured to:
receive a second message sent by a first base station, where the first base station is a base station serving the first user equipment, and the second message includes a third timing advance determined by the first base station; and
the processor 920 is specifically configured to:
determine the first timing advance according to the second timing advance and the third timing advance;
where the reference signal is sent by the first base station.

Optionally, the receiver 910 is specifically further configured to:
receive a second message sent by a first base station, where the first base station is a base station serving the first user equipment, and the second message includes third mapping information between multiple cells and multiple timing advances; and
the processor 920 is specifically configured to:
determine a first resource that is used when the second user equipment sends the first message;
determine, according to the first resource and second mapping information between multiple resources and multiple cells, a cell to which the second user equipment belongs;
determine, according to the third mapping information, a timing advance corresponding to the cell to which the second user equipment belongs; and
determine the first timing advance according to the second timing advance and the timing advance corresponding to the cell to which the second user equipment belongs;
where the reference signal is sent by the first base station.

Optionally, the first message received by the receiver 910 further includes an identifier;
the receiver 910 is specifically further configured to:
receive a second message sent by a first base station, where the first base station is a base station serving the first user equipment, and the second message includes third mapping information between multiple cells and multiple timing advances; and
the processor 920 is specifically configured to:
determine, according to the identifier, a cell to which the second user equipment belongs;
determine, according to the third mapping information, a timing advance corresponding to the cell to which the second user equipment belongs; and
determine the first timing advance according to the second timing advance and the timing advance corresponding to the cell to which the second user equipment belongs;
where the reference signal is sent by the first base station.

It should be understood that the second message received by the receiver 910 is sent by using downlink control information signaling, master information block signaling, system information block signaling, D2D synchronizing channel signaling, or radio resource control protocol signaling.

Optionally, in an embodiment, the receiver 910 is specifically configured to:
receive the first message sent by a first base station, where the first base station is a base station serving the first user equipment, and the first message includes third mapping information between multiple cells and multiple timing advances; and
receive a second message sent by the second user equipment; and
the processor 920 is specifically configured to:
determine, according to the second message, a cell to which the second user equipment belongs; and
determine, according to the third mapping information, a timing advance corresponding to the cell to which the second user equipment belongs, and determine that the timing advance corresponding to the cell to which the second user equipment belongs is the first timing advance;
where the reference signal is sent by the first base station.

Optionally, the second message received by the receiver 910 includes an identifier; and
the processor 920 is specifically configured to:
determine, according to the second message, a cell to which the second user equipment belongs, which includes:
determining, according to the identifier, the cell to which the second user equipment belongs; and
determining, according to the third mapping information, the timing advance corresponding to the cell to which the second user equipment belongs, and determining that the timing advance corresponding to the cell to which the second user equipment belongs is the first timing advance;
where the reference signal is sent by the first base station.

Optionally, the processor 920 is specifically configured to:
determine a second resource that is used when the second user equipment sends the second message;
determine, according to the second resource and second mapping information between multiple resources and multiple cells, the cell to which the second user equipment belongs; and
determine, according to the third mapping information, the timing advance corresponding to the cell to which the second user equipment belongs, and determine that the timing advance corresponding to the cell to which the second user equipment belongs is the first timing advance;
where the reference signal is sent by the first base station.

Optionally, in an embodiment, the receiver 910 is specifically configured to:
receive the first message sent by a third user equipment, where a cell to which the third user equipment belongs is the same as a cell to which the second user equipment belongs, and the first message includes the first timing advance; and
receive a second message sent by the second user equipment; and
the processor 920 is specifically configured to:
determine, according to the second message, the cell to which the second user equipment belongs;
determine, according to the cell to which the second user equipment belongs, a reference signal sent by the third user equipment; and
determine the reference time according to the reference signal sent by the third user equipment.

Optionally, the second message received by the receiver 910 includes an identifier; and the processor 920 is specifically configured to:

determine, according to the identifier, the cell to which the second user equipment belongs;

determine, according to the cell to which the second user equipment belongs, the reference signal sent by the third user equipment; and determine the reference time according to the reference signal sent by the third user equipment.

Optionally, the processor 920 is specifically configured to:

determine a second resource that is used when the second user equipment sends the second message;

determine, according to the second resource and second mapping information between multiple resources and multiple cells, the cell to which the second user equipment belongs;

determine, according to the cell to which the second user equipment belongs, the reference signal sent by the third user equipment; and determine the reference time according to the reference signal sent by the third user equipment.

Optionally, in an embodiment, the receiver 910 is specifically configured to:

receive the first message sent by a first base station, where the first base station is a base station serving the first user equipment, and the first message includes fourth mapping information between multiple resources and multiple timing advances; and the processor 920 is specifically configured to:

determine a third resource that is used when the D2D signal is detected; and determine, according to the third resource and the fourth mapping information, a timing advance corresponding to the third resource, and use the timing advance corresponding to the third resource as the first timing advance;

where the reference signal is sent by the first base station.

Optionally, in an embodiment, the receiver 910 is specifically configured to:

receive the first message sent by a third user equipment, where a cell to which the third user equipment belongs is the same as a cell to which the second user equipment belongs, and the first message includes fourth mapping information between multiple resources and multiple timing advances; and the processor 920 is specifically configured to:

determine a third resource that is used when the D2D signal is detected; and determine, according to the third resource and the fourth mapping information, a timing advance corresponding to the third resource, and use the timing advance corresponding to the third resource as the first timing advance;

where the reference signal is sent by the third user equipment.

Optionally, in an embodiment, the receiver 910 is specifically configured to:

receive the first message sent by a third user equipment, where a cell to which the third user equipment belongs is the same as a cell to which the second user equipment belongs, and the first message includes the first timing advance;

where the reference signal is sent by the third user equipment.

It should be understood that the first message received by the receiver 910 may be sent by the first base station or third user equipment by using downlink control information signaling, master information block signaling, system information block signaling, D2D synchronizing channel signaling, or radio resource control protocol signaling.

It should also be understood that in the embodiment of the present invention, the first user equipment 900 according to the embodiment of the present invention may be corresponding to an entity for executing a method according to an embodiment of the present invention, and may also be corresponding to the first user equipment 500, and that the foregoing and other operations and/or functions of each module in the first user equipment 900 are intended for implementing the corresponding procedure of each method in FIG. 1 to FIG. 4 separately, which is not further described herein for brevity.

Therefore, the first user equipment provided by the embodiment of the present invention may determine, by receiving a timing advance and a reference time, a time for detecting a D2D signal, so that when the first user equipment detects the D2D signal at the time, a D2D signal detection success rate can be improved.

Figure 10:
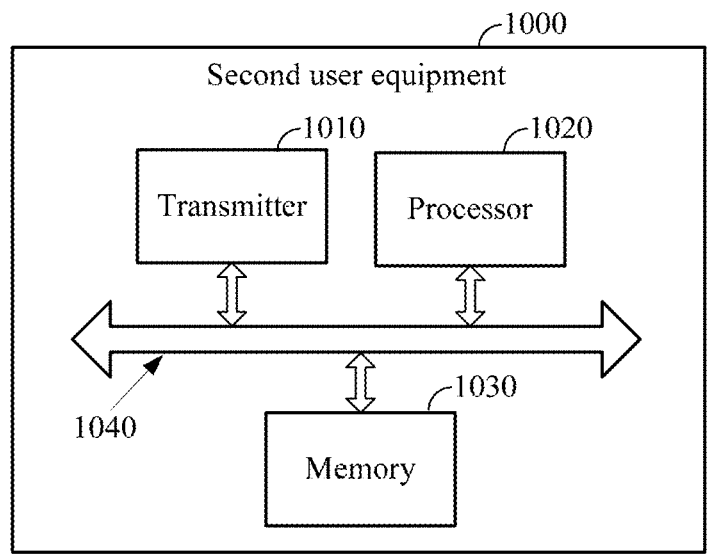
FIG. 10 shows a schematic block diagram of a second user equipment according to another embodiment of the present invention.

As shown in FIG. 10, an embodiment of the present invention further provides a second user equipment 1000, where the apparatus 1000 includes a transmitter 1010, a processor 1020, a memory 1030, and a bus system 1040, where the transmitter 1010, the processor 1020, and the memory 1030 are connected by using the bus system 1040, the memory 1030 is configured to store an instruction, and the processor 1020 is configured to execute the instruction stored by the memory 1030, where the processor 1020 is configured to:

generate a first message; and the transmitter 1010 is configured to:

send the first message to a first user equipment, where the first message is used to trigger the first user equipment to determine, according to the first message, a first timing advance for the first user equipment to detect a D2D signal sent by the second user equipment.

Therefore, the second user equipment provided by the embodiment of the present invention may trigger, by generating and sending a first message, a first user equipment to determine, according to the first message, a first timing advance for detecting a D2D signal sent by the second user equipment, and further determine a first time for detecting the D2D signal, which can improve a D2D signal detection success rate.

It should be understood that in the embodiment of the present invention, the processor 1020 may be a central processing unit (Central Processing Unit, "CPU" for short). The processor 1020 may also be a general processor, a digital signal processor (DSP), an application specific integrated circuit (ASIC), a field programmable gate array (FPGA) or a programmable logic device, a discrete gate or a transistor logic device, a discrete hardware assembly, or the like. The general processor may be a microprocessor or the processor may be any conventional processor, or the like.

The memory 1030 may include a read-only memory and a random access memory, and provide an instruction and data for the processor 1020. A part of the memory 1030 may further include a non-volatile random access memory. For example, the memory 1030 may further store device type information.

The bus system 1040 may further include a power bus, a control bus, a status signal bus, and the like, in addition to a data bus. However, for clear description, various buses in the figure are all marked as the bus system 1040.

In an implementation process, each step of the foregoing method may be implemented by using a hardware integrated logic circuit in the processor 1020, or by using an instruction in a software form. The steps of the method disclosed in the embodiment of the present invention may be directly reflected as being implemented by a hardware processor, or implemented by a combination of hardware and software modules in the processor. The software module may be located in a mature storage medium in the field such as a random memory, a flash memory, a read-only memory, a programmable read-only memory or an electrically erasable programmable read-only memory, and a register. The storage medium is located in the memory 1030, and the processor 1020 reads information from the memory 1030, and implements the steps of the foregoing method with reference to the hardware of the processor 1020. To avoid repetition, no detailed description is provided herein.

Optionally, in an embodiment, the first message includes a second timing advance for sending the D2D signal by the second user equipment and/or an identifier used to indicate a cell to which the second user equipment belongs.

It should be understood that in the embodiment of the present invention, the second user equipment 1000 according to the embodiment of the present invention may be corresponding to an entity for executing a method according to an embodiment of the present invention, and may also be corresponding to the second user equipment 600, and that the foregoing and other operations and/or functions of each module in the second user equipment 1000 are intended for implementing the corresponding procedure of each method in FIG. 1 to FIG. 4 separately, which is not further described herein for brevity.

Therefore, the second user equipment provided by the embodiment of the present invention may trigger, by generating and sending a first message, a first user equipment to determine, according to the first message, a first timing advance for detecting a D2D signal sent by the second user equipment, and further determine a first time for detecting the D2D signal, which can improve a D2D signal detection success rate.

Figure 11:
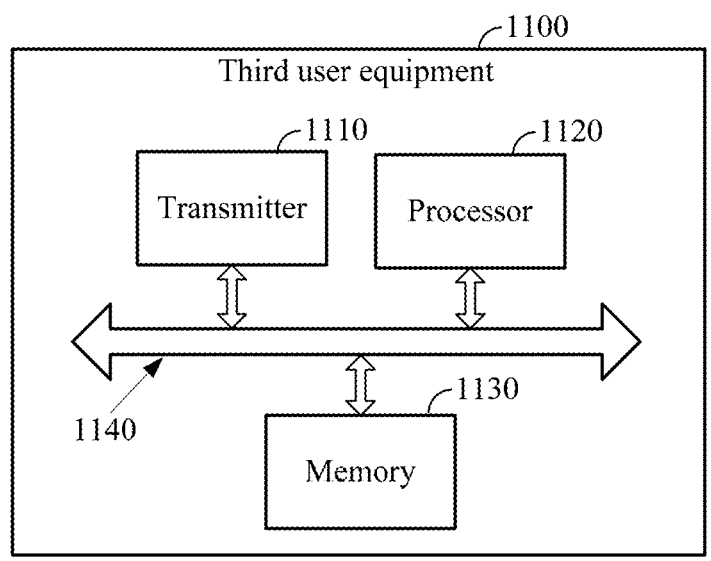
FIG. 11 shows a schematic block diagram of a third user equipment according to another embodiment of the present invention.

As shown in FIG. 11, an embodiment of the present invention further provides a third user equipment 1100, where the apparatus 1100 includes a transmitter 1110, a processor 1120, a memory 1130, and a bus system 1140, where the transmitter 1110, the processor 1120, and the memory 1130 are connected by using the bus system 1140, the memory 1130 is configured to store an instruction, and the processor 1120 is configured to execute the instruction stored by the memory 1130, where the transmitter 1110 is configured to:

send a first message to a first user equipment, where the first message is used to trigger the first user equipment to determine, according to the first message, a first timing advance for the first user equipment to detect a D2D signal sent by a second user equipment; and send a reference signal to the first user equipment, where the reference signal is used to determine a reference time for the first user equipment to detect the D2D signal sent by the second user equipment;

where a cell to which the third user equipment belongs is the same as a cell to which the second user equipment belongs.

Therefore, the third user equipment provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

It should be understood that in the embodiment of the present invention, the processor 1120 may be a central processing unit (Central Processing Unit, "CPU" for short). The processor 1120 may also be a general processor, a digital signal processor (DSP), an application specific integrated circuit (ASIC), a field programmable gate array (FPGA) or a programmable logic device, a discrete gate or a transistor logic device, a discrete hardware assembly, or the like. The general processor may be a microprocessor or the processor may be any conventional processor, or the like.

The memory 1130 may include a read-only memory and a random access memory, and provide an instruction and data for the processor 1020. A part of the memory 1130 may further include a non-volatile random access memory. For example, the memory 1130 may further store device type information.

The bus system 1140 may further include a power bus, a control bus, a status signal bus, and the like, in addition to a data bus. However, for clear description, various buses in the figure are all marked as the bus system 1140.

In an implementation process, each step of the foregoing method may be implemented by using a hardware integrated logic circuit in the processor 1120, or by using an instruction in a software form. The steps of the method disclosed in the embodiment of the present invention may be directly reflected as being implemented by a hardware processor, or implemented by a combination of hardware and software modules in the processor. The software module may be located in a mature storage medium in the field such as a random memory, a flash memory, a read-only memory, a programmable read-only memory or an electrically erasable programmable read-only memory, and a register. The storage medium is located in the memory 1130, and the processor 1120 reads information from the memory 1130, and implements the steps of the foregoing method with reference to the hardware of the processor 1120. To avoid repetition, no detailed description is provided herein.

Optionally, in an embodiment, the first message includes the first timing advance for detecting the D2D signal by the first user equipment.

Optionally, in another embodiment, the first message includes mapping information between multiple resources and multiple timing advances.

It should be understood that the first message sent by the transmitter 1110 may be sent by the third user equipment 1100 by using downlink control information signaling, master information block signaling, system information block signaling, D2D synchronizing channel signaling, or radio resource control protocol signaling.

It should also be understood that in the embodiment of the present invention, the third user equipment 1100 according to the embodiment of the present invention may be corresponding to an entity for executing a method according to an embodiment of the present invention, and may also be corresponding to the third user equipment 700, and that the foregoing and other operations and/or functions of each module in the third user equipment 1100 are intended for implementing the corresponding procedure of each method in FIG. 1 to FIG. 4 separately, which is not further described herein for brevity.

Therefore, the third user equipment provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

Figure 12:
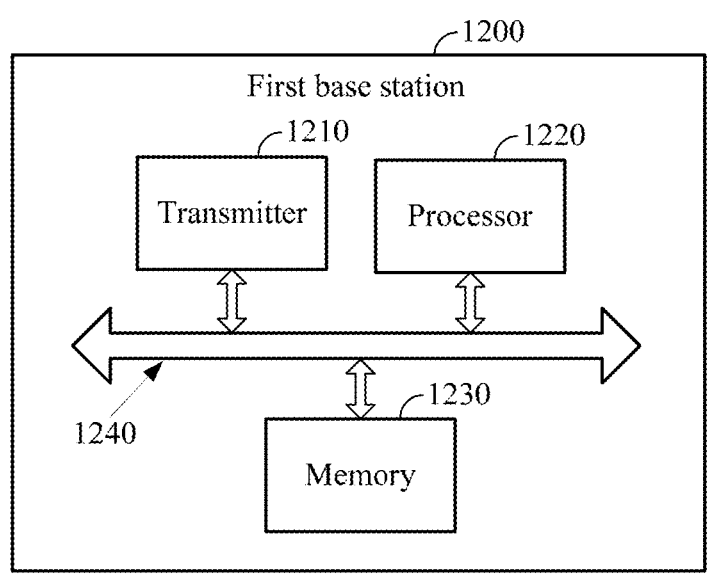
FIG. 12 shows a schematic block diagram of a first base station according to another embodiment of the present invention.

As shown in FIG. 12, an embodiment of the present invention further provides a first base station 1200, where the apparatus 1200 includes a transmitter 1210, a processor 1220, a memory 1230, and a bus system 1240, where the transmitter 1210, the processor 1220, and the memory 1230 are connected by using the bus system 1240, the memory 1230 is configured to store an instruction, and the processor 1220 is configured to execute the instruction stored by the memory 1230, where the transmitter 1210 is configured to:

send a first message to a first user equipment, where the first user equipment is a user equipment served by the first base station, and the first message is used to trigger the first user equipment to determine, according to the first message, a first timing advance for the first user equipment to detect a D2D signal sent by a second user equipment; and send a reference signal to the first user equipment, where the reference signal is used to determine a reference time for the first user equipment to detect the D2D signal sent by the second user equipment.

Therefore, the first base station provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

It should be understood that in the embodiment of the present invention, the processor 1220 may be a central processing unit (Central Processing Unit, "CPU" for short). The processor 1220 may also be a general processor, a digital signal processor (DSP), an application specific integrated circuit (ASIC), a field programmable gate array (FPGA) or a programmable logic device, a discrete gate or a transistor logic device, a discrete hardware assembly, or the like. The general processor may be a microprocessor or the processor may be any conventional processor, or the like.

The memory 1230 may include a read-only memory and a random access memory, and provide an instruction and data for the processor 1020. A part of the memory 1230 may further include a non-volatile random access memory. For example, the memory 1230 may further store device type information.

The bus system 1240 may further include a power bus, a control bus, a status signal bus, and the like, in addition to a data bus. However, for clear description, various buses in the figure are all marked as the bus system 1240.

In an implementation process, each step of the foregoing method may be implemented by using a hardware integrated logic circuit in the processor 1220, or by using an instruction in a software form. The steps of the method disclosed in the embodiment of the present invention may be directly reflected as being implemented by a hardware processor, or implemented by a combination of hardware and software modules in the processor. The software module may be located in a mature storage medium in the field such as a random memory, a flash memory, a read-only memory, a programmable read-only memory or an electrically erasable programmable read-only memory, and a register. The storage medium is located in the memory 1230, and the processor 1220 reads information from the memory 1230, and implements the steps of the foregoing method with reference to the hardware of the processor. To avoid repetition, no detailed description is provided herein.

Optionally, in an embodiment, the first message includes the first timing advance or a timing advance for sending uplink data by the first user equipment.

Optionally, in another embodiment, the first message includes mapping information, where the mapping information is mapping information between multiple user equipments and multiple timing advances, mapping information between multiple cells and multiple timing advances, or mapping information between multiple resources and multiple timing advances.

It should be understood that the first message sent by the transmitter 1210 may be sent by the first base station 1200 by using downlink control information signaling, master information block signaling, system information block signaling, D2D synchronizing channel signaling, or radio resource control protocol signaling.

It should also be understood that in the embodiment of the present invention, the first base station 1200 according to the embodiment of the present invention may be corresponding to an entity for executing a method according to an embodiment of the present invention, and may also be corresponding to the first base station 800, and that the foregoing and other operations and/or functions of each module in the first base station 1200 are intended for implementing the corresponding procedure of each method in FIG. 1 to FIG. 4 separately, which is not further described herein for brevity.

Therefore, the first base station provided by the embodiment of the present invention may trigger, by sending a first message and a reference signal to a first user equipment, the first user equipment to determine, according to the first message and the reference signal, a first time for detecting a D2D signal, which can improve a D2D signal detection success rate.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for detecting a device-to-device (D2D) signal, the method comprising:
   receiving, by a first user equipment, a first message sent by a second user equipment, wherein the first message comprises a timing advance for sending the D2D signal by the second user equipment;
   receiving, by the first user equipment, a reference signal sent by a first base station that serves the first user equipment;
   determining, by the first user equipment, a reference time according to the reference signal;
   determining, by the first user equipment, according to the timing advance and the reference time, a first time for detecting the D2D signal; and
   detecting, by the first user equipment, the D2D signal at the first time.

2. A first user equipment, comprising:
   a receiver configured to receive:
      a first message sent by a second user equipment, wherein the first message comprises a timing advance for sending a device-to-device (D2D) signal by the second user equipment, and
      a reference signal sent from a first base station that serves the first user equipment; and
   at least one processor configured to:
      determine a reference time according to the reference signal,
      determine, according to the timing advance and the reference time, a first time for detecting the D2D signal, and
      detect the D2D signal at the first time.

3. The method of claim 1, wherein:
   the timing advance comprises a first timing advance; and
   the first timing advance comprises a timing advance for sending uplink data by the first base station.

4. The method of claim 1, wherein the first message further comprises first mapping information between a plurality of user equipment and a plurality of timing advances.

5. The method of claim 1, wherein:
   the first message further comprises an identifier; and
   determining, by the first user equipment, the reference time according to the reference signal comprises:
      determining, by the first user equipment, a cell to which the second user equipment belongs according to the identifier,
      determining, by the first user equipment, a reference signal of the cell to which the second user equipment belongs, and
      determining, by the first user equipment, the reference time according to the reference signal of the cell to which the second user equipment belongs.

6. The method of claim 1, further comprising:
   receiving, by the first user equipment, the D2D signal from the second user equipment.

7. The method of claim 1, further comprising:
   receiving, by the first user equipment, the D2D signal from the second user equipment after detecting the D2D signal at the first time.

8. The first user equipment of claim 2, wherein:
   the timing advance comprises a first timing advance; and
   the first timing advance comprises a timing advance for sending uplink data by the first base station.

9. The first user equipment of claim 2, wherein the first message further comprises first mapping information between a plurality of user equipment and a plurality of timing advances.

10. The first user equipment of claim 2, wherein:
    the first message further comprises an identifier; and
    to determine the reference time according to the reference signal, the at least one processor is configured to:
       determine a cell to which the second user equipment belongs according to the identifier,
       determine a reference signal of the cell to which the second user equipment belongs, and
       determine the reference time according to the reference signal of the cell to which the second user equipment belongs.

11. The first user equipment of claim 2, wherein the receiver is further configured to:
    receive the D2D signal from the second user equipment.

12. The first user equipment of claim 2, wherein the receiver is further configured to:
    receive the D2D signal from the second user equipment after detecting the D2D signal at the first time.

13. A non-transitory, computer-readable storage medium storing one or more computer executable instructions that, when executed by one or more processors, cause the one or more processors to:
- receive a first message from a user equipment, wherein the first message comprises a timing advance for sending a device-to-device (D2D) signal by the user equipment;
- receive a reference signal from a first base station, wherein the first base station serves the first user equipment, and wherein the reference signal is a signal for determining a reference time;
- determine the reference time according to the reference signal;
- determine, according to the timing advance and the reference time, a first time for detecting the D2D signal; and
- detect the D2D signal at the first time.

14. The non-transitory, computer-readable storage medium of claim 13, wherein:
- the timing advance comprises a first timing advance; and
- the first timing advance comprises a timing advance for sending uplink data by the first base station.

15. The non-transitory, computer-readable storage medium of claim 13, wherein the first message further comprises first mapping information between a plurality of user equipment and a plurality of timing advances.

16. The non-transitory, computer-readable storage medium of claim 13, wherein:
- the first message further comprises an identifier; and
- to determine the reference time according to the reference signal, the one or more executable instructions, when executed by the one or more processors, cause the one or more processors to:
  - determine a cell to which the second user equipment belongs according to the identifier,
  - determine a reference signal of the cell to which the second user equipment belongs, and
  - determine the reference time according to the reference signal of the cell to which the second user equipment belongs.

17. The non-transitory, computer-readable storage medium of claim 13, wherein the one or more executable instructions, when executed by the one or more processors, further cause the one or more processors to receive the D2D signal from the second user equipment.

18. The non-transitory, computer-readable storage medium of claim 13, wherein the one or more executable instructions, when executed by the one or more processors, further cause the one or more processors to receive the D2D signal from the second user equipment after detecting the D2D signal at the first time.

* * * * *